(12) United States Patent
Shaw et al.

(10) Patent No.: US 6,780,225 B2
(45) Date of Patent: Aug. 24, 2004

(54) REFLOW OVEN GAS MANAGEMENT SYSTEM AND METHOD

(75) Inventors: Russell G. Shaw, Hopkinton, NH (US); Roy J. Palhof, York, ME (US)

(73) Assignee: Vitronics Soltec, Inc., Stratham, NH (US)

( * ) Notice: Subject to any disclaimer, the term of this patent is extended or adjusted under 35 U.S.C. 154(b) by 22 days.

(21) Appl. No.: 10/185,377

(22) Filed: Jun. 27, 2002

(65) Prior Publication Data

US 2003/0218058 A1 Nov. 27, 2003

Related U.S. Application Data

(60) Provisional application No. 60/383,165, filed on May 24, 2002.

(51) Int. Cl.[7] .......................... B23K 1/008; B01D 53/26
(52) U.S. Cl. .......................... 95/273; 95/288; 55/385.6; 55/DIG. 29; 34/77; 34/79; 34/468; 228/43; 228/219; 432/176; 219/388
(58) Field of Search .................. 34/76, 77, 79, 34/468, 469; 95/273, 288; 55/385.1, 385.6, 392, 467.1, 338.1, DIG. 29; 228/42, 43, 219, 220; 432/176; 219/388

(56) References Cited

U.S. PATENT DOCUMENTS

| | | | |
|---|---|---|---|
| 3,543,532 A | 12/1970 | Gatton et al. .................. | 62/256 |
| 3,625,133 A | 12/1971 | Hayashi .......................... | 98/36 |
| 4,321,031 A | * 3/1982 | Woodgate ..................... | 432/11 |
| 4,696,226 A | 9/1987 | Witmer .......................... | 98/36 |
| 4,726,506 A | * 2/1988 | Kondo .......................... | 228/37 |
| 4,823,680 A | 4/1989 | Nowotarski .................... | 98/36 |
| 4,951,401 A | 8/1990 | Suzuki et al. .................. | 34/77 |
| 5,031,818 A | 7/1991 | Gieskes ......................... | 228/42 |
| 5,069,380 A | 12/1991 | Deambrosio .................. | 228/42 |
| 5,090,651 A | 2/1992 | Mittag .......................... | 228/219 |

(List continued on next page.)

FOREIGN PATENT DOCUMENTS

| | | |
|---|---|---|
| EP | 0 307 319 A | 3/1989 |
| EP | 0631530 B1 | 7/1996 |
| EP | 0 999 007 A | 5/2000 |
| JP | 2002-246738 A * | 6/2003 |

OTHER PUBLICATIONS

*US Patent Application Publication, Publication No. US2002/0018977A1, Publication date Feb. 14, 2002, "Continuous Furnace Having Traveling Gas Barrier," Gary Orbeck, filing date Aug. 30, 2001, CL 432/121.

"Flux Flow Control™ Prevents Process Contaminants Getting Into the Cooling Zone No Process Filters or Condensers", *News Bulletin Nr. 4*, Jan. 1999.

International Search Report, Sep. 15, 2003, PCT/US03/16528 (29582–101PCT).

International Application No. PCT/US03/16528 (29582–101PCT), International Filing Date May 23, 2003.

*Primary Examiner*—Frank M. Lawrence
(74) *Attorney, Agent, or Firm*—Perkins Smith & Cohen, LLP; Jacob N. Erlich; Peter J. Borghetti

(57) ABSTRACT

Reflow solder oven gas management system introduces an inert gas into and removes contaminated gas from a reflow oven tunnel (42) at predetermined points (6, 8) to influence the oven tunnel gas flow and to dilute and expel excess oxygen. The contaminated gas is ducted to a flux separation system (34) to be cleaned, for example remove flux vapors, and returned in part to the tunnel (42) for recirculation and with the remainder routed to end baffle boxes (54) for tunnel end pressurization and exhaust. The system has sufficient pressure to supply end baffle boxes (54) with clean gas to create a gas barrier to effectively seal off the tunnel ends from air infiltration or migration into the tunnel making the system insensitive to external pressure and/or temperature variations. The invention also includes alternative embodiments, low flow oxygen bleed valves (72) to maintain low oxygen content in the oven process tunnel.

22 Claims, 11 Drawing Sheets

U.S. PATENT DOCUMENTS

| | | | |
|---|---|---|---|
| 5,125,556 A | 6/1992 | Deambrosio | 228/42 |
| 5,294,036 A | 3/1994 | Dopper | 228/37 |
| 5,345,061 A | 9/1994 | Chanasyk et al. | 219/388 |
| 5,356,066 A | 10/1994 | Yamada | 228/8 |
| 5,405,074 A | 4/1995 | Dopper et al. | 228/42 |
| 5,481,087 A | 1/1996 | Willemen | 219/388 |
| 5,573,688 A | 11/1996 | Chanasyk et al. | 219/388 |
| 5,579,981 A | 12/1996 | Matsumura et al. | 228/19 |
| 5,611,476 A | 3/1997 | Soderlund et al. | 228/42 |
| 5,795,146 A | 8/1998 | Orbeck | 432/176 |
| 5,993,500 A | 11/1999 | Bailey et al. | 55/385.6 |
| 6,120,585 A * | 9/2000 | Inomata et al. | 96/377 |
| 6,146,448 A | 11/2000 | Shaw et al. | 95/287 |
| 6,193,774 B1 * | 2/2001 | Durdag et al. | 55/385.6 |
| 6,283,748 B1 | 9/2001 | Orbeck et al. | 432/126 |
| 6,382,500 B1 | 5/2002 | Master et al. | 228/180.1 |
| 6,576,030 B2 * | 6/2003 | Mullins | 55/385.1 |

\* cited by examiner

REFLOW OVEN GAS MANAGEMENT SYSTEM AND METHOD

CROSS REFERENCE TO RELATED APPLICATIONS

This application claims priority of Provisional Application No. 60/383,165, entitled REFLOW OVEN GAS MANAGEMENT SYSTEM AND METHOD filed on May 24, 2002, and is incorporated herein by reference.

FIELD OF THE INVENTION

This invention relates generally to the field of reflow soldering ovens, and, more particularly to a method and an apparatus for removing flux vapors and other volatile contaminants from the atmosphere of such ovens.

BACKGROUND OF THE INVENTION

Printed circuit boards are commonly fabricated using the reflow solder technique. A paste containing solder particles mixed with flux, adhesives, binders, and other components is applied to selected areas of a printed circuit board. Electronic devices are pressed into the applied solder paste. Adhesives in the paste hold the devices to the printed circuit board. A conveyor within a reflow oven tunnel carries the printed circuit board and devices through regions of varying temperatures within the oven, each region performing a specific step in the reflow process. Generally an initial (preheat) region will bring the circuit board and devices to a predetermined temperature for flux reaction. A second (soak) region will maintain this reaction temperature for a predetermined time. Flux in the solder paste reacts with the contacts to remove oxides and to enhance wetting. A third (reflow) region will heat the circuit boards and devices to a temperature sufficient to cause the solder particles in the paste to melt. Molten solder wets metal contacts on the devices and printed circuit board. The conveyor moves the heated printed circuit board to a fourth (cooling) region of the oven where the molten solder solidifies forming a completed electronic circuit.

The reaction of the flux with the contacts liberates vapors. Further, heat within the oven vaporizes flux as well as adhesives, binders, and other components of the solder paste, devices, and circuit boards. The vapors from these materials accumulate within the oven leading to a number of problems. If the vapors migrate to a cooler region they will condense on the circuit boards, contaminating the boards and making subsequent cleaning steps necessary. The vapors will also condense on cooler surfaces within the oven, clogging gas orifices, gumming up moving parts, and creating a fire hazard. This condensate may also drip onto subsequent circuit boards destroying them, or making subsequent cleaning steps necessary. In addition, condensed vapors may contain corrosive and toxic chemicals, which can damage equipment and create a hazard to personnel.

The flux vapors and other volatile compounds generated by the reflow operation collectively are referred to in this application as "volatile contaminants." It is understood that this term is intended to encompass all reaction products released when the printed circuit board is heated, including flux vapors, vapors from all other components of the solder paste, as well as all vapors out-gassed from the printed circuit board and the electronic devices.

Volatile contaminants can be flushed from the oven by providing a continuous supply of clean gas. This is commonly done in machine operating with air as the process gas by drawing fresh air in both ends of the oven and exhausting the air along with volatile contaminants from the inner regions of the oven as described in U.S. Pat. No. 5,345,061 by Chanasyk et al. This is not an ideal solution for the cases where the oven must be filled with a substantially inert gas, for example nitrogen. Generating additional inert gas in volumes adequate to flush these ovens (2000 cfh or more) is expensive.

The approaches of volatile contaminant removal that do not involve condensing tend to lack feasibility due to cost, scientific complexity, physical impracticality or a combination of all of these. Incineration, for instance, requires impracticably high temperatures. UV decomposition utilized very expensive equipment. Filtration in the gaseous state requires a filter far to fine to consider at the volumes needed. Nuclear disintegration has obvious problems related to radioactive materials.

Generally, the prior art involves removal, filtration, and reintroduction of inert gas to the oven, however, they fail to address the complex gas flow patterns necessary to maintain a clean, substantially inert atmosphere while also maintaining the precise temperature profile required by the reflow process.

These complex flow patterns in the tunnel are both natural and created. They may either help or hinder attempts to optimize various process parameters. It is necessary to consider each of these various parameters separately before designing a flow scheme that is the best compromise for the process as a whole.

Flows for substantially inert gas optimization need to purge the entire tunnel of air and pressurize the center such that flows are out both ends impeding any flow of outside environment in. Flows optimized for substantially inert gas containment are not compatible with control of volatile contaminant condensation as all volatile contaminants pass through the coolest regions of the oven where they condense before they reach the exhaust, and also may not be optimized for zone temperature definition.

It is therefore an object of this invention to provide an apparatus and a method for the control of the complex gas flow patterns in a reflow soldering oven to maintain a clean inert atmosphere while maintaining the precise temperature profile.

It is another object of this invention to provide an apparatus and a method to reduce operating expenses by conserving substantially inert gas.

It is yet another objective of this invention to provide an apparatus and a method to minimize the sensitivity of oven external pressure and/or temperature variations on the oven internal environment.

BRIEF SUMMARY OF THE INVENTION

The objects set forth above as well as further and other objects and advantages of the present invention are achieved by the embodiments of the invention described herein below.

The present invention introduces an substantially inert gas, for example nitrogen, in a reflow oven tunnel at predetermined points to influence the oven tunnel gas flow and to dilute and expel excess oxygen from the system. Tunnel gas is ducted from the tunnel at selected points to a flux separation system to be cleaned, for example remove flux vapors, and returned to the tunnel for recirculation, thereby conserving the substantially inert gas and maintaining a low oxygen environment. Additionally, the substantially inert gas is introduced in amounts larger than required to create and maintain tunnel gas flow. The system maintains sufficient pressure to supply end baffle boxes with clean gas to create a gas barrier to effectively seal off the tunnel ends from air infiltration or migration into the tunnel making the system insensitive to external pressure and/or temperature variations.

The substantially inert gas, such as nitrogen, is cold relative to the tunnel gas at the point of introduction. The cold gas will mix with the hotter gas thereby absorbing excess heat for better zone temperature control. The cold source gas mixing with the hotter gas causes an expansion of the tunnel gas. The tunnel gas is drawn in both directions by the tunnel gas outlets of the recirculation system.

Preferably, substantially inert gas is introduced into the pre-heat and/or soak zones of the tunnel mixing with the tunnel gas. The mixed gas primarily flows toward the reflow zone to prevent condensation and for zone temperature definition. Some mixed gas splits and flows toward select outlets in the pre-heat and soak zones to be ducted to the flux separation system for cleaning prior to recirculation. Additional inert gas is introduced into the cooling zone of the tunnel mixing with the tunnel gas and flowing back toward the reflow zone. The counter flowing gases converge at the boundary of the high temperature region and a cooling region to mix and exit the tunnel toward the flux separation system for cleaning and recirculation. The amount of substantially inert gas can be varied at each introduction inlet to account for gas expansion differentials and flow direction.

After cleaning, some of the clean gas is ducted back to recirculation ports for introduction back into the tunnel and the remaining clean gas is ducted to the end baffle boxes located at either or both ends of the oven tunnel to create a gas barrier preventing outside air from entering the tunnel. Recirculated gas can be reintroduced at points in the tunnel to cause flow generally from colder areas into hotter areas, with maximum flow out of the cool zones and flow out of a zone where flux build up problems are the worst. Recirculated flows are introduced into the baffle boxes for pressure control, baffling, and exhaust. The system exhausts through the baffle boxes more gas than input to account for expansion of the substantially inert gas due to heating.

The exhaust system, defined by the baffle boxes, recirculated gas and exhaust hoods, generally are not be used to remove contamination from the system, but only to remove the excess expansion gas, which has been cleaned, recirculated, used to pressurize the baffle box, and allowed to draft out of the baffle space to the exhaust hood, thereby inhibiting the in-flow of oxygen contained in the outside air. The exhaust hoods are located above the tunnel ends outside of the baffle boxes. The exhaust hoods can be ducted to the customers facility exhaust. The flow from the recirculation system into the baffle boxes are preferably set at a flow equal to the substantially inert gas input plus expansion to keep the pressure inside the tunnel constant, with no-flow through the baffle area and into the oven tunnel.

Baffle boxes are, preferably, incorporated at both ends of the oven to form isolation zones between the constantly changing pressure and drafts of the factory and the expanding and contracting gas flows within the tunnel. Since the baffle box preferably is pressurized by clean recirculated gas at a rate slightly higher than the substantially inert gas, such as nitrogen, input rate plus an expansion factor, the recirculated gas is metered through a series of small orifices onto a flat angled surface to create a series of low-level laminar flows. These flows come from both top and bottom of the reflow oven. The outer most flows are, preferably, allowed to draft out of the oven to be picked up by a low level flow exhaust hoods at the ends of the tunnel constituting the entire exhaust volume. The innermost flows will cause a pressurized space to keep expansion gas from the tunnel from flowing through the baffle space. The fact that the baffle boxes are supplied with recirculated gas is significant in several ways. It is preferred that no inert gas is dumped to the factory essentially unused and un-expanded; thus decreasing inert gas consumption. There is also no tunnel gas migrating through the baffle area disturbing the desired flow. This action also de-couples the flow of the baffle boxes from the flow in the tunnel in order to reduce the buoyancy driven mixing at the tunnel ends. Also since this recirculated gas is heated and ducted to top and bottom of both tunnel ends, the buoyancy effect is much reduced.

In alternative embodiments, low oxygen content in the tunnel gas is desired to improve system performance, for example filtration of contaminants. In such cases, low flow valves are employed to bleed low volumes of air into the tunnel at one or more pre-selected locations, thereby controlling the parts per million of oxygen mixed with the tunnel gas.

In air only machines, the possibility exists to exhaust the cleaned gas up a stack rather than returning it to the oven. This may result in an extremely clean air machine with simple gas flow, with resultant possible energy conservation.

For a better understanding of the present invention, together with other and further objects thereof, reference is made to the accompanying drawing and detailed description of preferred embodiments of the invention.

DETAILED DESCRIPTION OF PREFERRED EMOBIMENTS

Prior to providing the detailed description of preferred embodiments of the apparatus and method of this invention, it is first preferable to provide the following information.

Flows optimized for volatile contaminant control are designed to move gas from cooler toward hotter regions of the tunnel to eliminate any condensation, and with a high exhaust throughput to expel contaminants. The most important flow in this scheme is the flow through the cool region toward the hotter region to eliminate any counter flow of volatile contaminants.

For zone temperature definition optimization, flows are desired which move from cooler zone toward hotter zones. Gas input has been used both to accomplish flow direction and to add cooling especially next to high heat areas. Flows optimized for zone definition are entirely dependent upon the profile selected.

Once flow patterns are understood, it is also important to consider that the gas in tunnel reflow ovens is used for many different purposes. Gas flow separation between zones in the tunnel allows temperature separation between those zones. Controlling the direction of tunnel flows from cooler to hotter can not only allow higher zone differentials, but can also inhibit condensation in the cooler areas. Nitrogen or other gases are used to inert the tunnel by diluting and displacing oxygen. For example, nitrogen input and expansion in the tunnel pressurizes and isolates the tunnel from outside pressure fluctuations. Nitrogen is used to create flows and pressure in the baffle areas to inhibit the reentry of oxygen. Hot gas is the heat transfer medium of the convection oven. Gas recirculation in a zone carries the particular heat energy of that zone to the printed circuit board. Hot gas is the transport media for the volatile contaminants from the tunnel to an exhausting or filtering mechanism. Therefore, inert ovens generally have several features within them to provide and maintain the inert atmosphere. These include: Process Gas Input and Distribution system, Oven Gas Circulation system, Condense and Filter system, Gas Reintroduction system, Tunnel End Baffle system, and the Exhaust system. Gas introduced to inert the oven will pass through and impact the effectiveness all of these systems. Therefore, to be most effective, these systems must be combined into one comprehensive gas management system.

Figure 1:
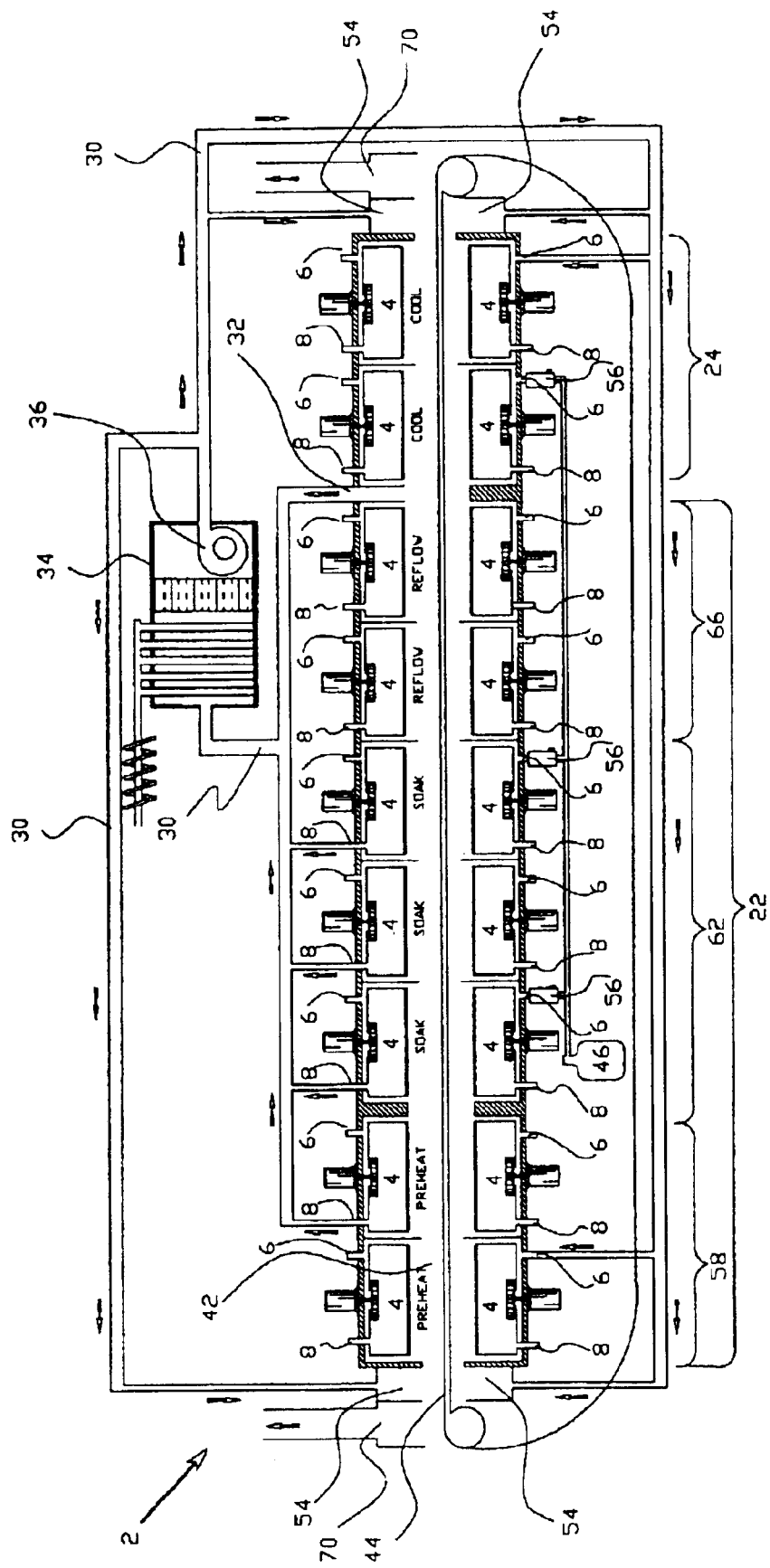
FIG. 1 is a schematic diagram of an reflow oven according to a preferred embodiment of the present invention.

The preferred embodiment of the present invention is shown in FIG. 1. Reflow oven 2 includes two vertically opposed rows of temperature cells 4 forming the process tunnel 42, which is sectioned off into a high temperature region 22 and a cooling region 24. The high temperature region 22 can be divided into several zones, for example, pre-heat zones 58, soak zone 62, and reflow zones 66, as illustrated in FIG. 1. A conveying mechanism 44 for carrying objects to be heated, for example printed circuit boards, runs through the process tunnel 42. A process gas reservoir 46 for storing a substantially inert gas, for example nitrogen, can be provided to supply the process tunnel 42 with a particular process gas. Selected inlet ports 6 are piped from the process gas reservoir 46 through flow meters 56. Substantially inert gas enters the process tunnel 42 through the temperature cells 4 (described in detail below with respect to FIG. 2). The volume of substantially inert gas through each of these flow meters 56 is set at a rate to produce the desired pressure and flow direction in that portion of the process tunnel 42. Pressure is caused not only by the introduction of this process gas, but also by the expansion of the cold gas due to heat, as described in FIG. 2, in the process tunnel 42. The location of these selected inlet ports 6 are such that the flows caused in the process tunnel 42 are generally from the cool region 24 to the high temperature region 22, and from cooler to hotter areas within the high temperature region, to impede the flow of volatile laden gas from migrating to the cooler regions where it will condense. This also concentrates the volatile laden gas in regions where the outlets 8 and barrier vent 32 connect to the condensation and filtration chamber 34 (described in greater detail in FIG. 3), thereby removing the volatile laden gas from the process tunnel 42 to be cleaned and recirculated. The barrier vent 32 is located between the high temperature region 22 and the cooling region 24 of the oven 2. The barrier vent 32 allows gas from the high temperature region 22 that would otherwise migrate into the cooling region 24 to be drawn out of the process tunnel 42 into the recirculation ducting 30. Selected outlet ports 8 are interconnected through recirculation ducting 30 to a condensation and filtration chamber 34 (described in greater detail in FIG. 3). A recirculation blower 36 located inside chamber 34 powers and controls the flow of gases within the recirculation ducting 30 the process tunnel 42. Clean gas is ducted from the condensation and filtration chamber 34 to the process tunnel 42 by two separate routes, both powered by recirculation blower 36. The first route is into several selected inlet ports 6 with a volume bias toward the cooling region 24 such that a flow is created from the cooling region 24 to the high temperature region 22 to inhibit volatiles from the high temperature region 22 from migrating into the cooling region 24. This prevents condensation of these volatiles on cool surfaces in the cooling region 24. The positioning of inlet ports 6 and outlets 8 are derived from specific operating parameters.

Figure 2:
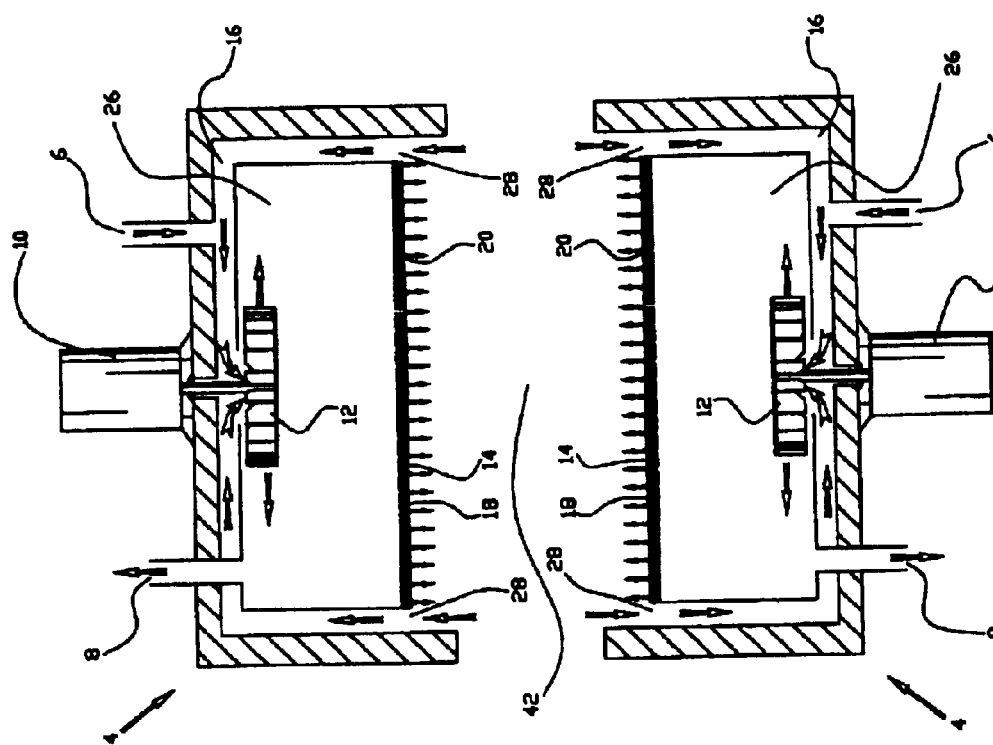
FIG. 2 is a partial cross-section view showing a temperature cell used in the reflow oven of FIG. 1.

A preferred embodiment of a temperature cell 4 of the present invention is illustrated in FIG. 2, shown as a top and bottom pair, as described in U.S. Pat. No. 5,345,061, entitled CONVECTION/INFRARED SOLDER REFLOW APPARATUS UTILIZING CONTROLLED GAS FLOW, issued Sep. 6, 1994, and incorporated by reference herein. An inlet port 6 and an outlet port 8 are provided on each cell 4. The inlet port 6 is connected with a return channel 16. The return channel 16 is connected with a centrifugal fan 12 driven by a motor 10. The centrifugal fan 12 is contained within a plenum 26. A diffuser 14 forms the bottom surface of the plenum 26. Imbedded in the diffuser 14 is a heating element 18. Holes 20 are provided through the diffuser 14 and heating element 18 so that gas driven by the fan 12 exits the plenum 26 into the process tunnel 42. The return channel 16 has inlets 28 opening into the process tunnel 42 allowing the gas exiting the plenum 26 to return to the fan 12 and back out through the diffusers 14 and heater 18. The outlet port 8 is connected with the plenum 26. The pressure drop of the gas drawn along the return channel 16 by the fan 12 causes suction through the inlet port 6. Positive pressure within the plenum 26 forces gas out of the outlet port 8. The gas forced by the fan 12 is heated by the heating element 18 and heats objects, for example printed circuit boards, in the process tunnel 42 by convection.

Figure 3:
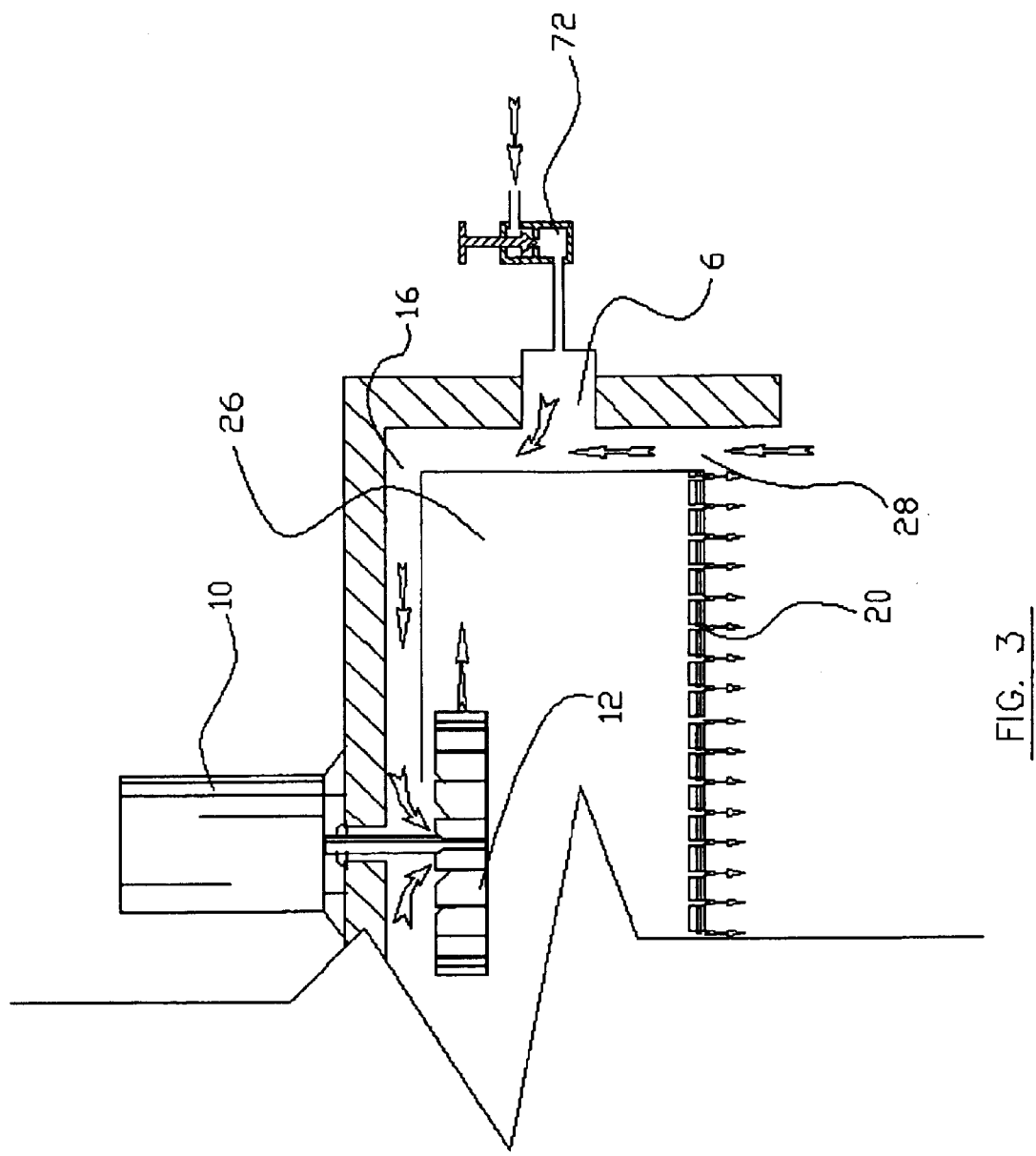
FIG. 3 is a pictorial representation of an air valve used to bleed low volumes of air into the oven.

In an alternative temperature cell embodiment of the present invention for use with low oxygen content in the tunnel gas desired to improve the system performance, for example filtration of contaminants, a low flow valve 72, as shown in FIG. 3, is operably connected to an inlet port 6 not being used for the delivery of primary inert gas. Low volumes of air bleed into the tunnel at one or more preselected locations, thereby controlling the parts per million of oxygen mixed with the tunnel gas. Further, as an alternative to the air bleed valves is a direct connection to an oxygen supply can be incorporated in the present system.

Figure 4:
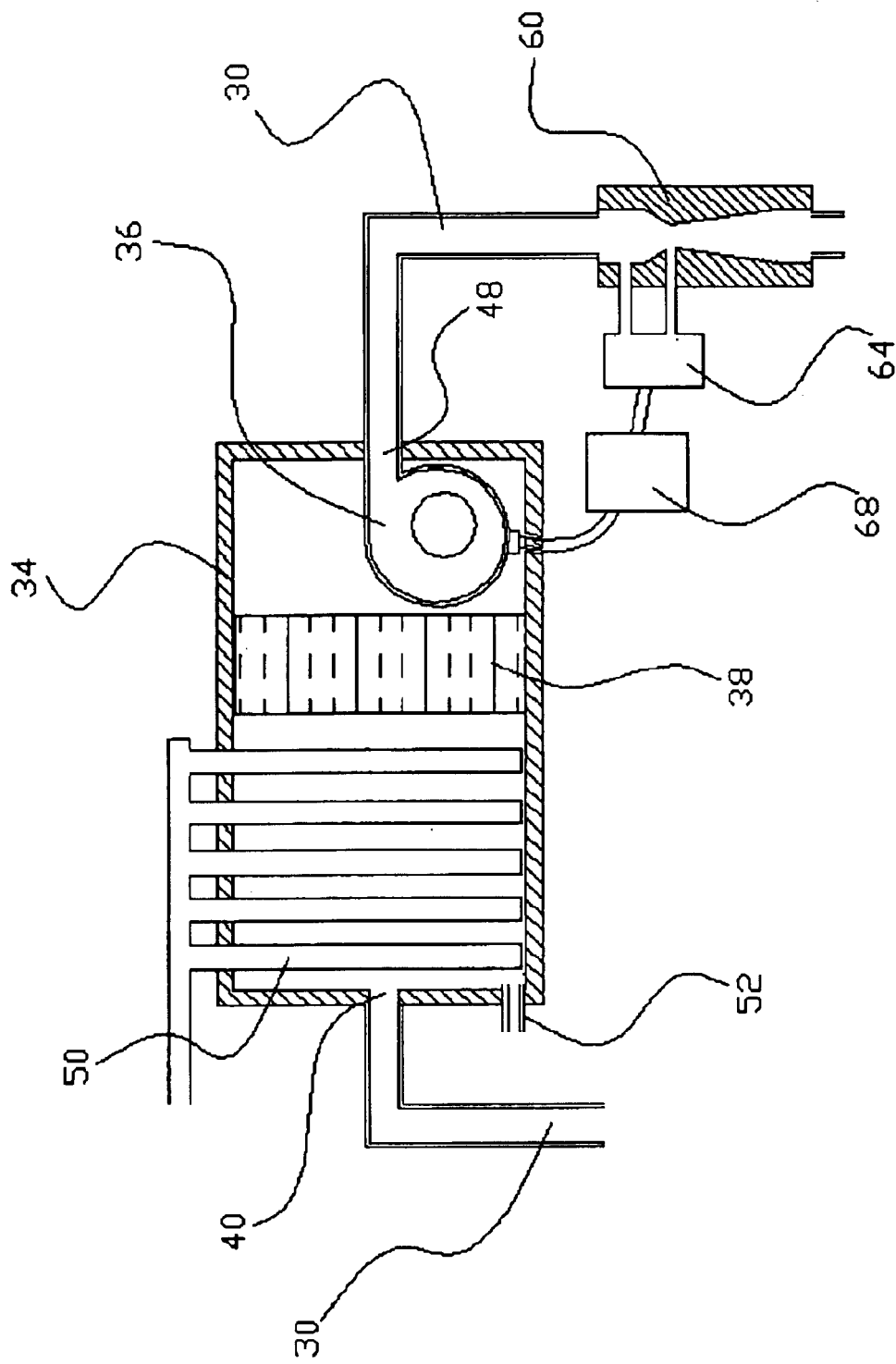
FIG. 4 is a schematic cross-section view of a preferred embodiment of a condensation and filtration system usable in the FIG. 1 oven and other embodiments of the present invention.
Figure 4A:
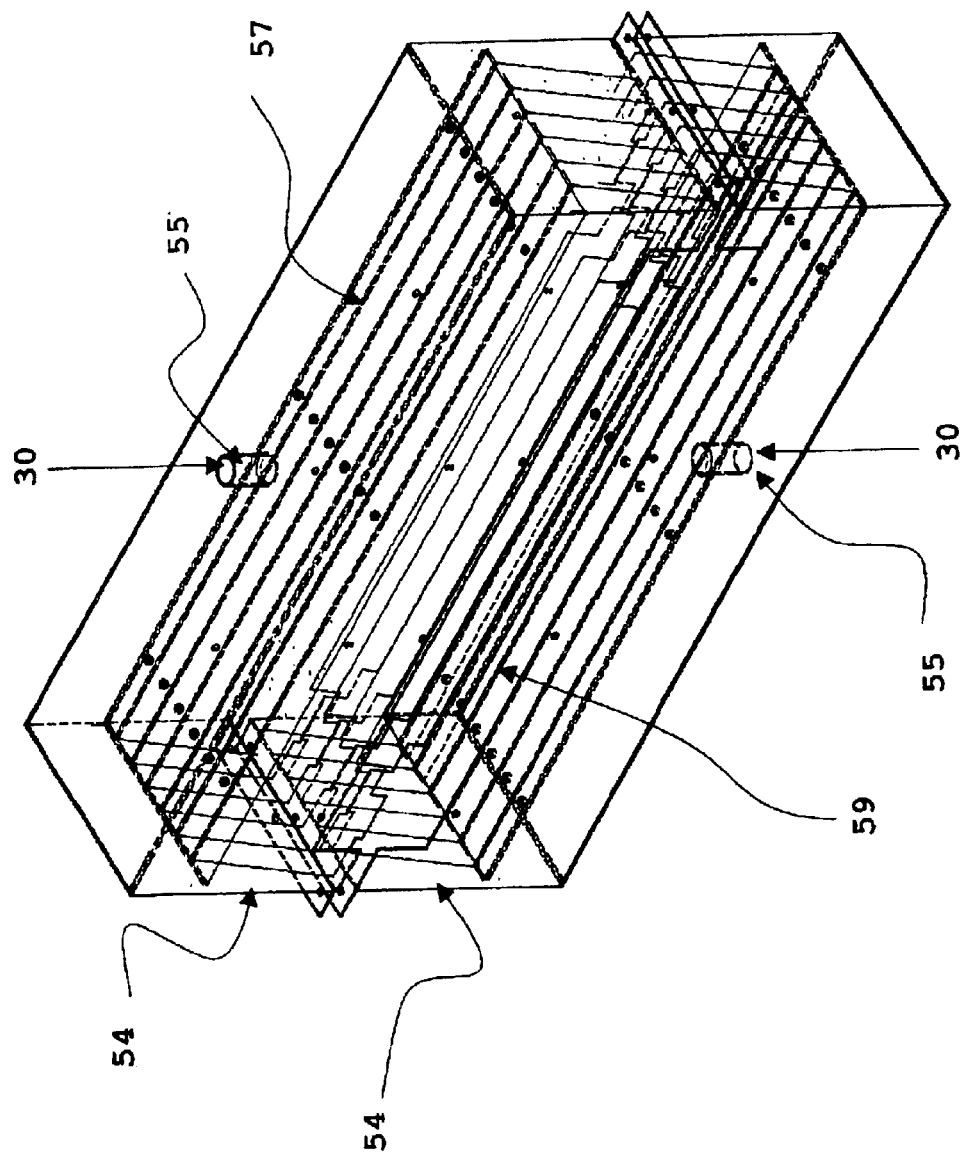
Figure 4B:
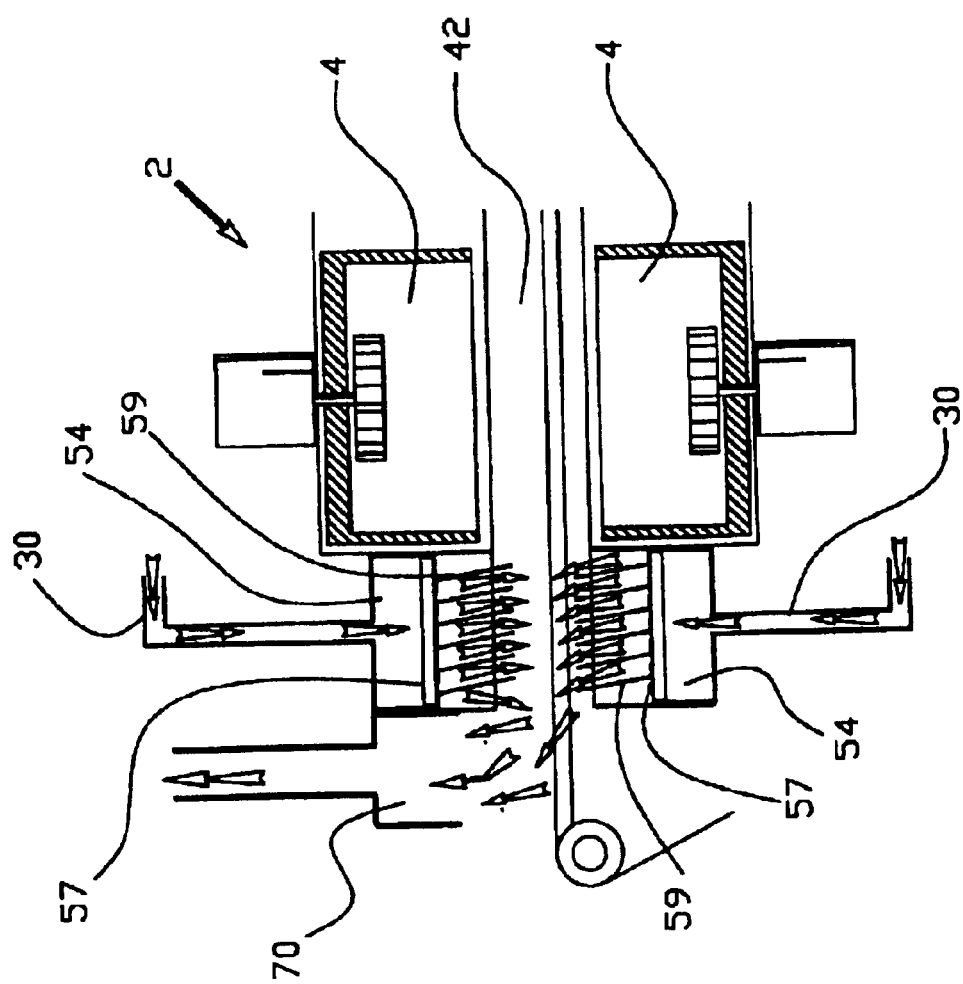

Condensation and filtration chamber 34 used with the present invention is shown in FIG. 4. An inlet port 40 in chamber 34 is connected to the oven 2 through the recirculation ducting 30. A recirculation blower 36 draws the tunnel gas out of the process tunnel 42 through outlet port 8 and into chamber 34 gas containing volatiles. The tunnel gas is drawn past several condensing plates 50 to condense the volatiles into liquid, which will run off the plates 50 into chamber 34 to be drained from the system through drain 52; or particles which will be drawn into and captured by filter

38. The cleaned tunnel gas is then past through recirculation blower 36 exiting the chamber through outlet port 48 and returned as recirculated gas back into process tunnel 42 through recirculation ducting 30. The terms clean gas and recirculated gas or decontaminated gas are used interchangeably throughout the specification, which contains substantially inert gas mixed with low levels of oxygen and other gases. The flow from the recirculation blower 36 is set to a pre-determined value. A venturi flow meter 60 and pressure transmitter 64 senses the flow. The value is calculated by a computer 68 such that as the filter 38 becomes saturated, flow remains constant by speeding up the recirculation blower 36 until a predetermined speed triggers a signal to provide an indication to change the filter 38.

Figure 5:
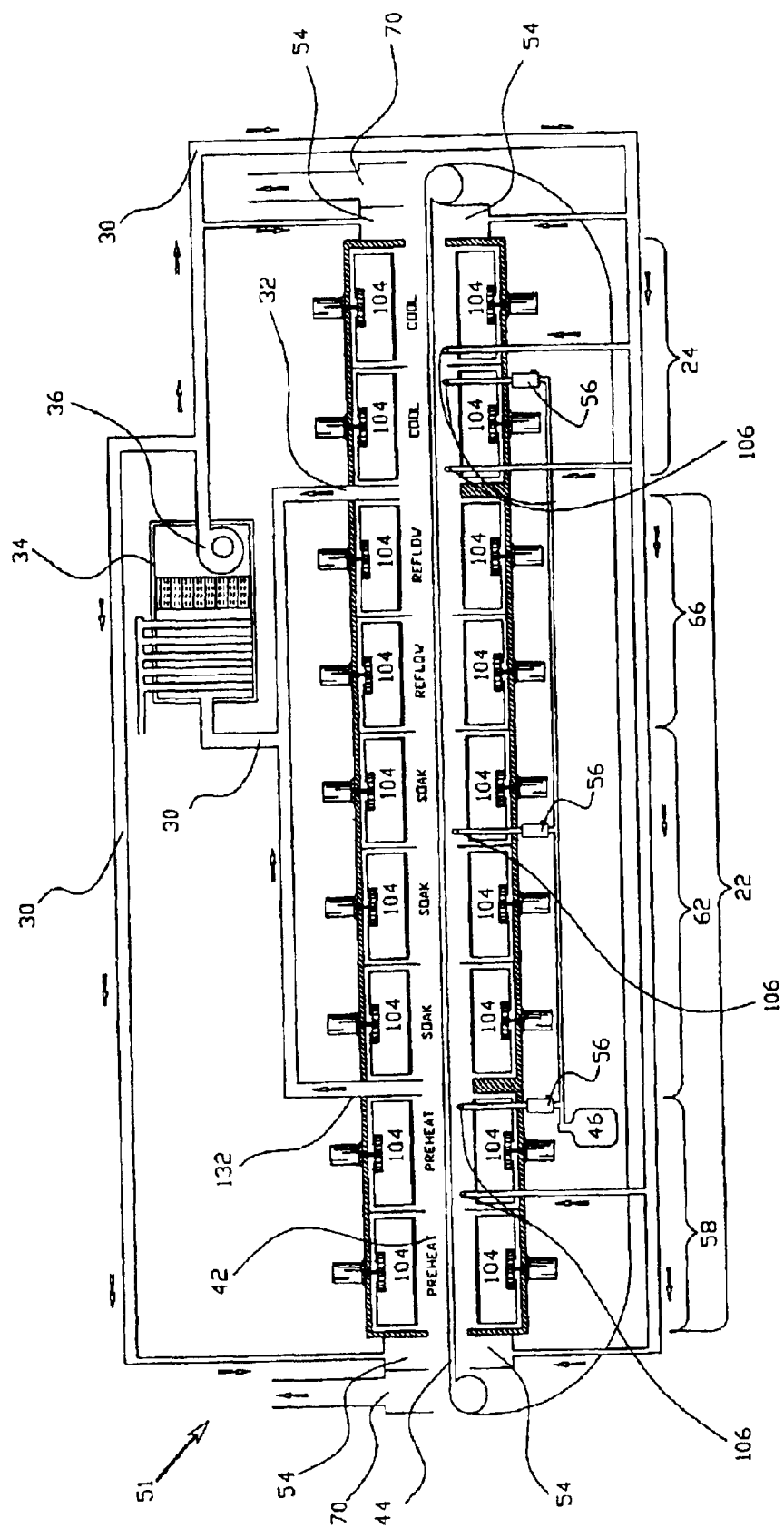
FIG. 5A is a pictorial representation of a tunnel end baffle usable in the FIG. 1 oven and other embodiments of the present invention.
FIG. 5B is a preferred embodiment of a schematic diagram of a tunnel end baffle usable in the FIG. 1 oven and other embodiments of the present invention.
Figure 5A:
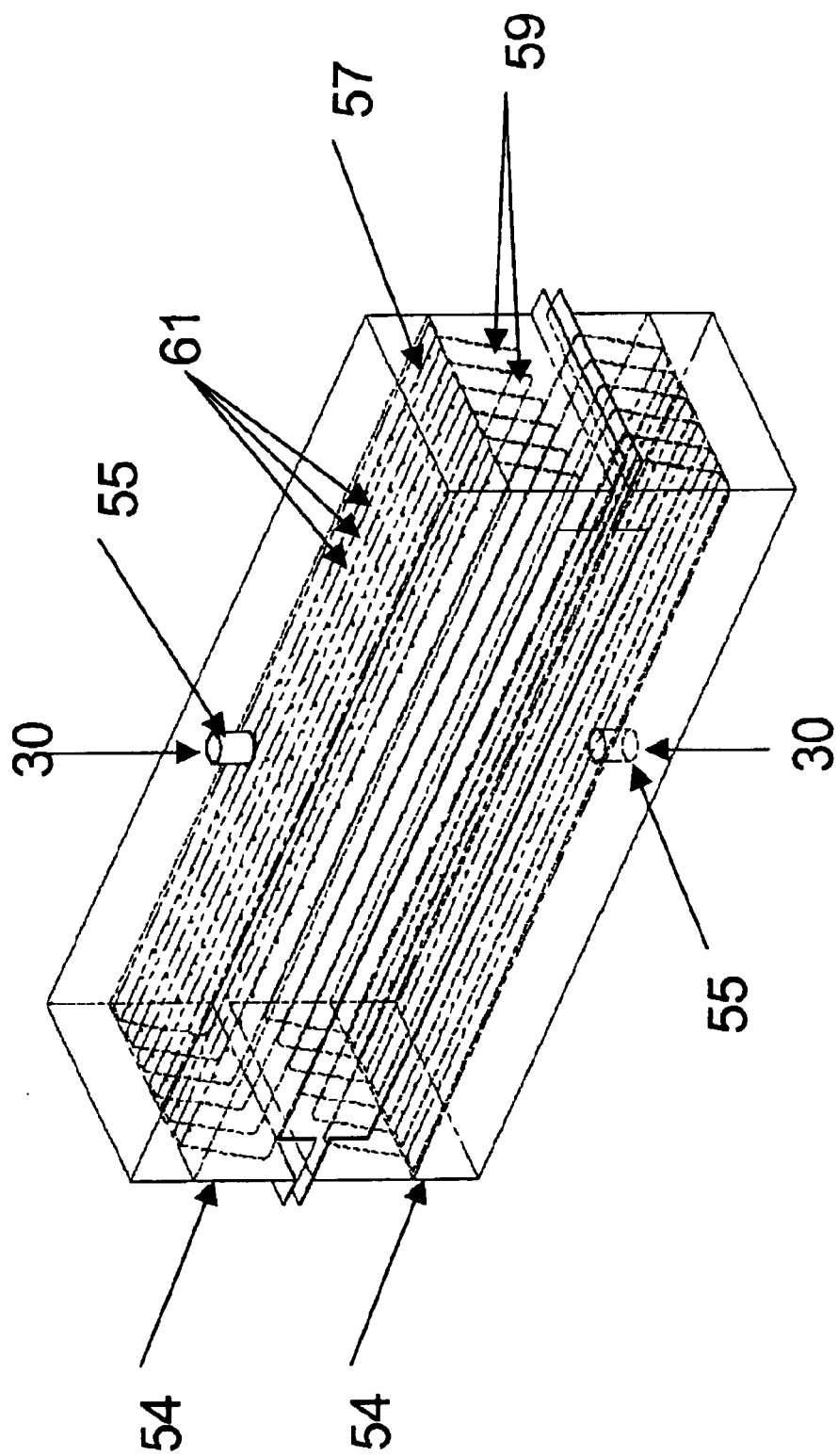
Figure 5B:
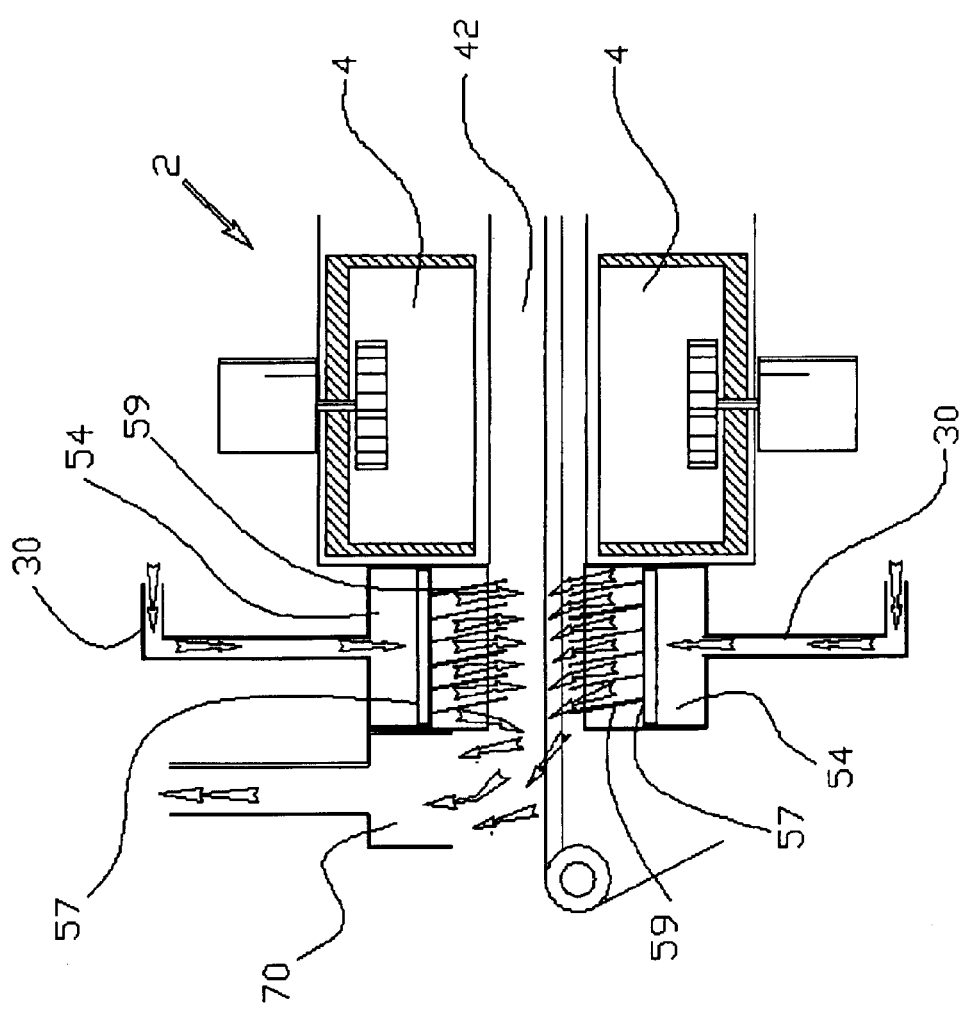

The tunnel end baffle boxes 54, shown in FIGS. 5A and 5B, are located both top and bottom of both ends of the process tunnel 42. The tunnel end baffle boxes 54 are the second route of the clean gas returning from the condensation and filtration chamber 34 through the recirculation ducting 30 to baffle inlet port 55. The clean gas passes through the tunnel end baffle boxes 54 then out of the oven 2 into the exhaust hood 70, as shown in FIG. 1. Since the baffle box 54 preferably is pressurized by clean recirculated gas at a rate slightly higher than the substantially inert gas, for example nitrogen, input rate plus an expansion factor, the recirculated gas, as shown in FIG. 5A, is metered through an orifice plate 57 with a series of small holes 61 onto a flat angled surface 59 to create a series of low-level laminar flows. Clean recirculated gas blown into these tunnel end baffle boxes 54 causes a high pressure area which impedes the flow of air from the outside environment from entering the process tunnel 42, which would cause deterioration of the inert atmosphere therein and higher volumes of process gas to be required. This flow further impedes the encroachment of outside environment into the inert atmosphere. These flows will be from both top and bottom of the reflow oven. The outer most flows will be allowed to draft out of the oven to be picked up by a low level flow exhaust hoods at the ends of the tunnel constituting the entire exhaust volume. The innermost flows will cause a pressurized space to keep expansion gas from the tunnel from flowing through the baffle space. Further, with all exhaust gas exiting the process tunnel 42 through the tunnel end baffle boxes 54, the flows inside the process tunnel 42 are isolated from outside influences, thereby enhancing the temperature control for the reflow process.

Figure 6:
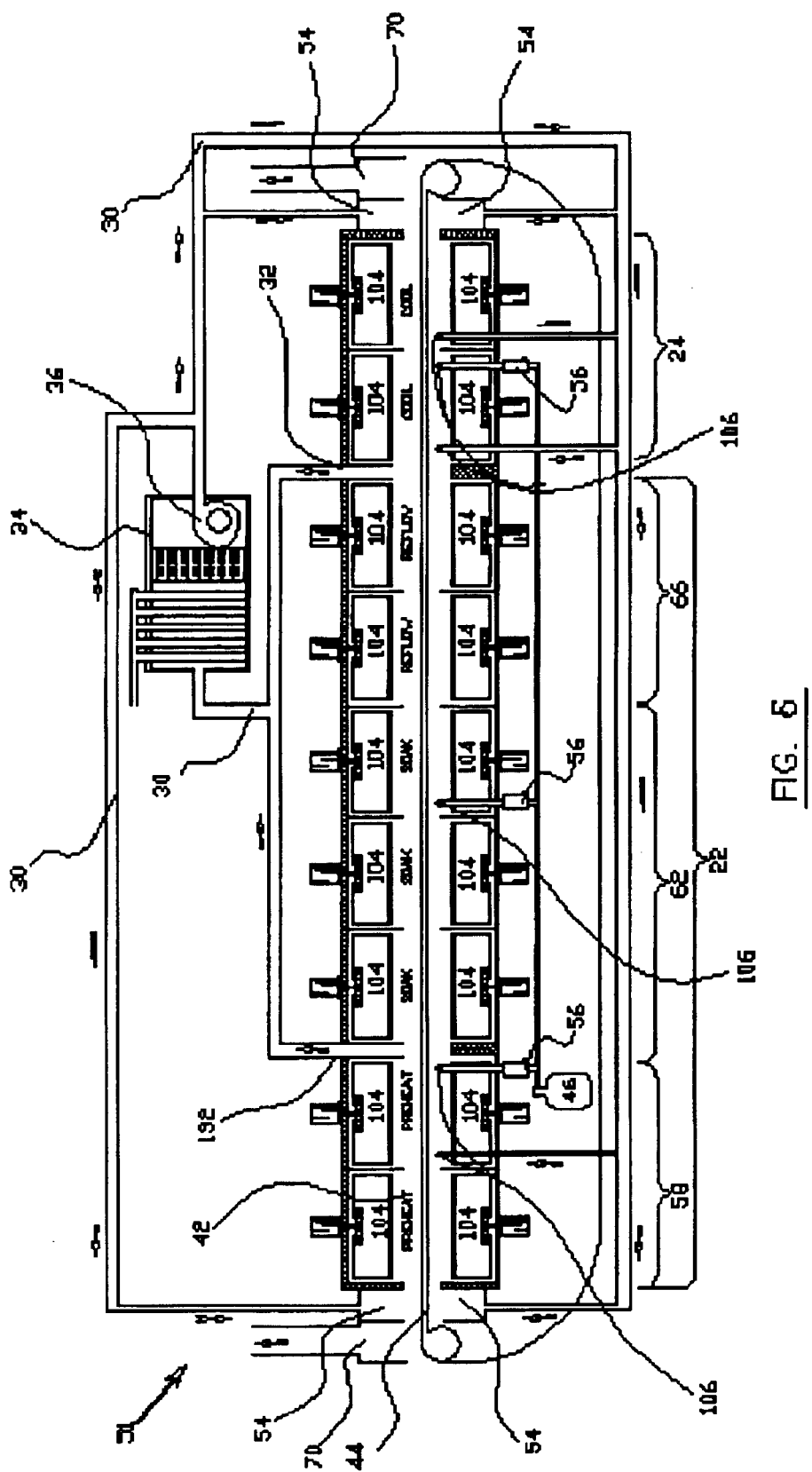
FIG. 6 is a schematic diagram of an oven with attached apparatus according to an alternative preferred embodiment of the present invention.

A further preferred embodiment of the present invention, 51, where similar components use identical reference numbers as shown in FIG. 1 is illustrated in FIG. 6. The basic components of the oven 2 of FIG. 1 are employed here. The difference between the embodiments is the method of the introduction of the substantially inert and recirculated gas into the process tunnel 42 and the removal of tunnel gas. The oven 51 introduces gases directly into the process tunnel 42 bypassing the temperature cell 4, and removes gases directly from the process tunnel 42 bypassing the temperature cell 4. The location of these selected inlet ports 106 are such that the flows caused in the process tunnel 42 are generally from the cool region 24 to the high temperature region 22, from cooler to hotter areas within the high temperature region 22, to impede the flow of volatile laden gas from migrating to the cooler regions where it will condense. The method of using a tube or equivalent provides flexibility to adapt substantially all existing reflow solder ovens with a gas management system as disclosed in the alternative embodiment 2, as well as being the used in future reflow solder oven designs.

Figure 7:
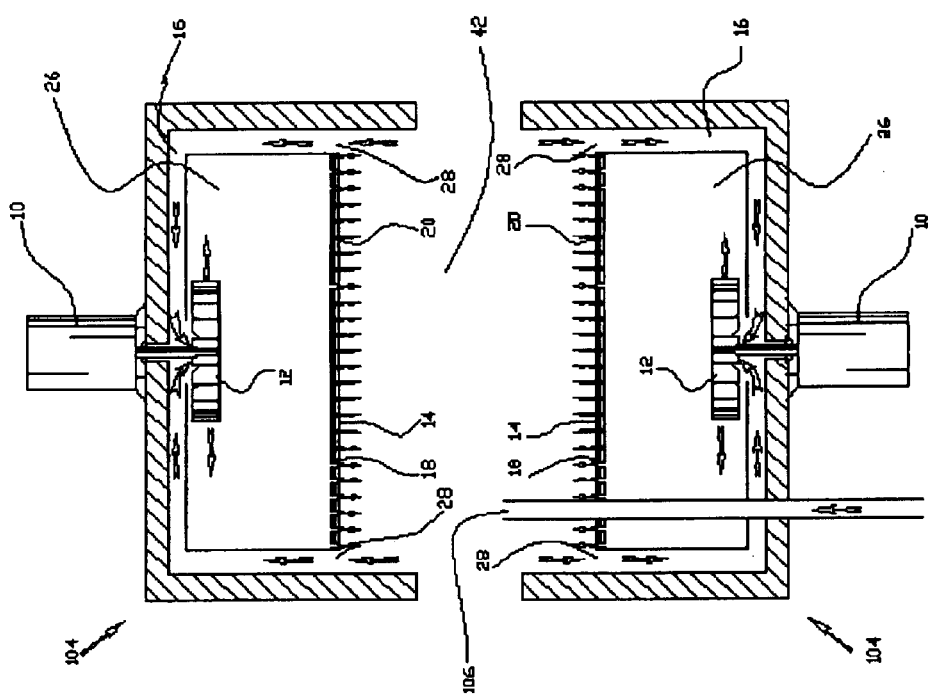
FIG. 7 is a diagram showing a temperature cell used in the oven of FIG. 6.
Figure 1:
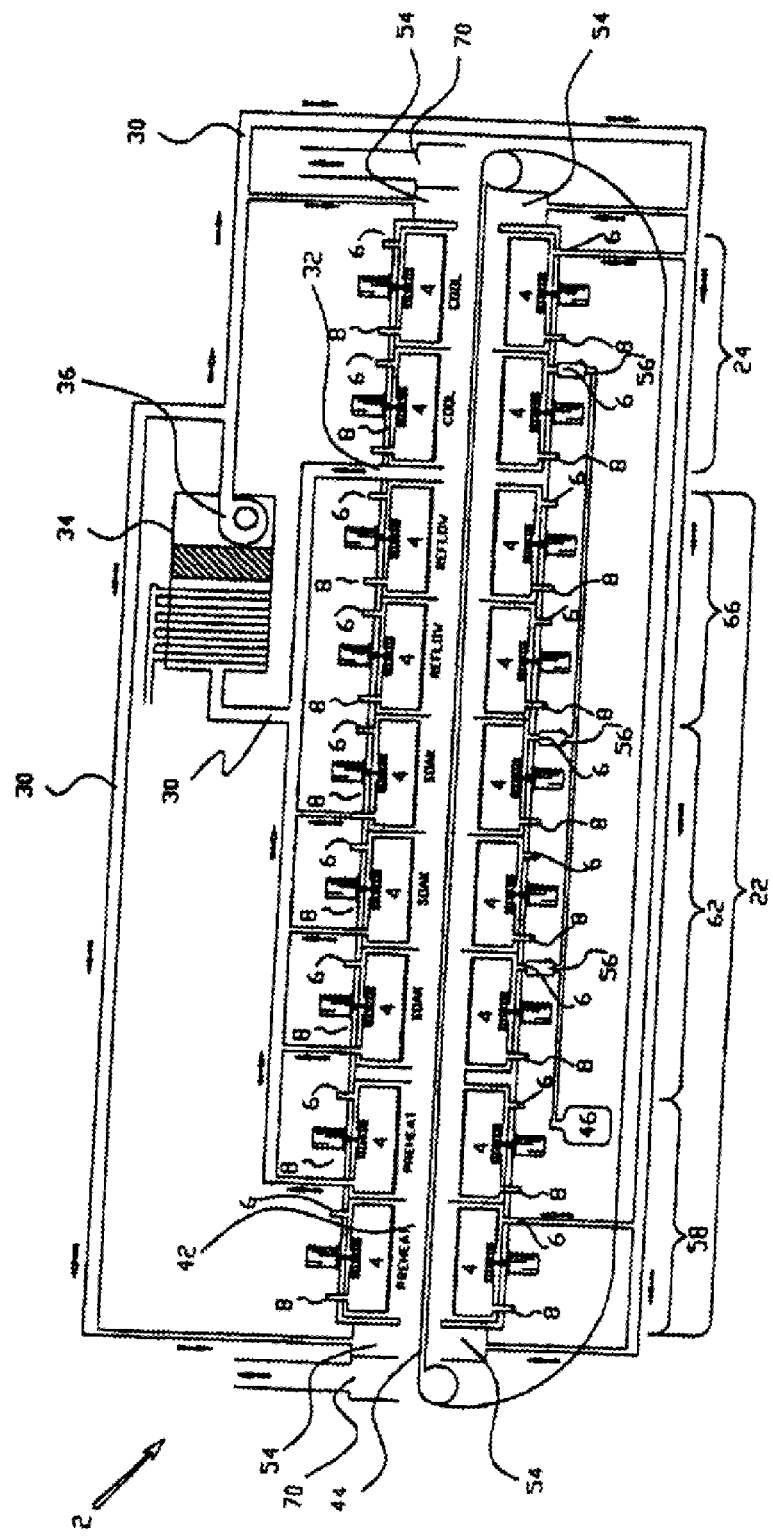
Figure 2:
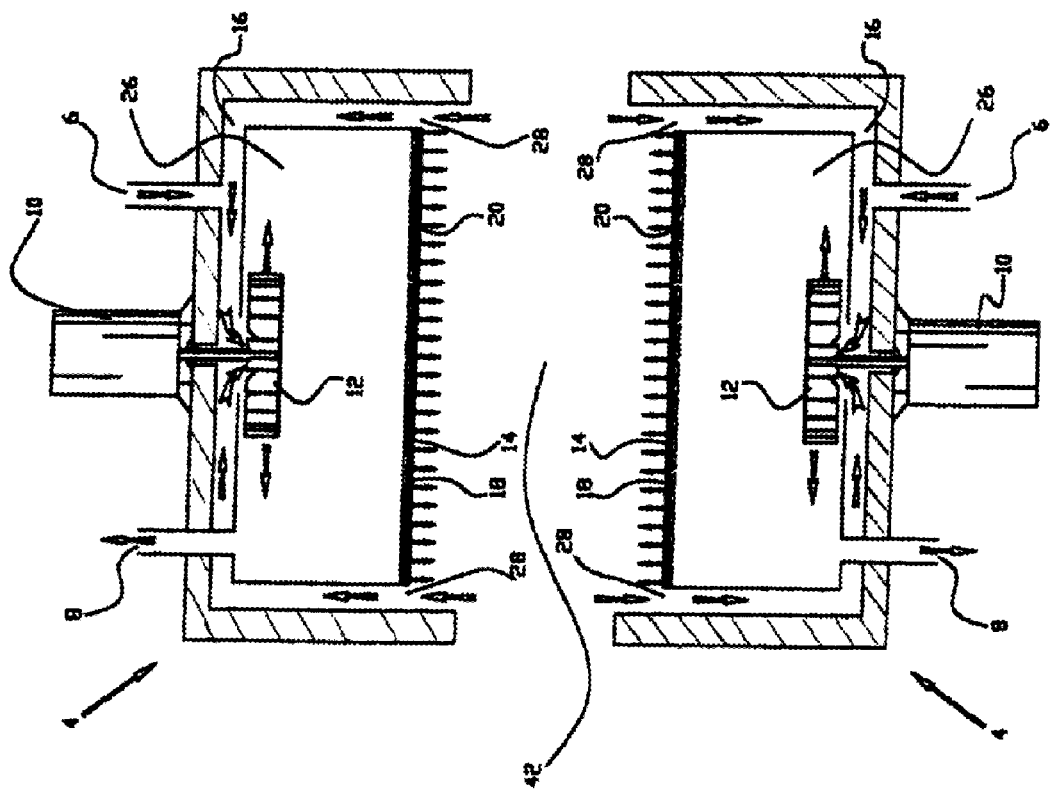
Figure 3:
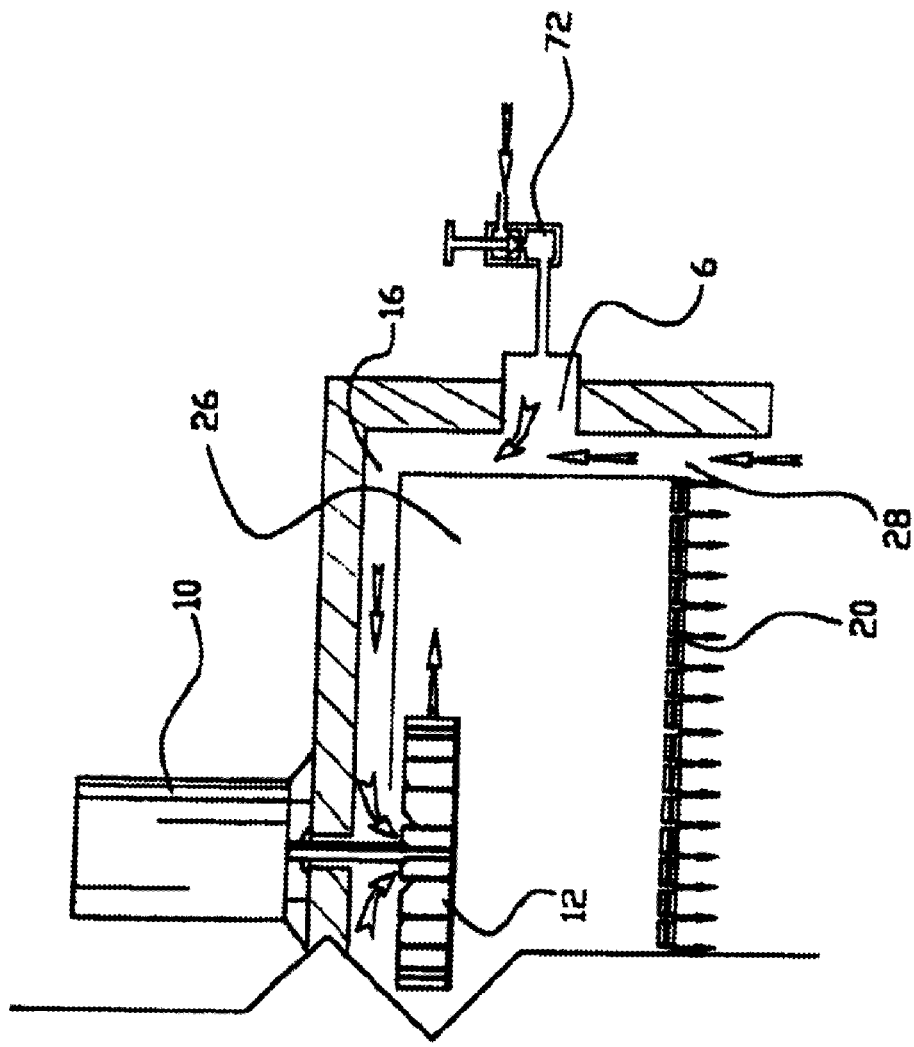
Figure 4:
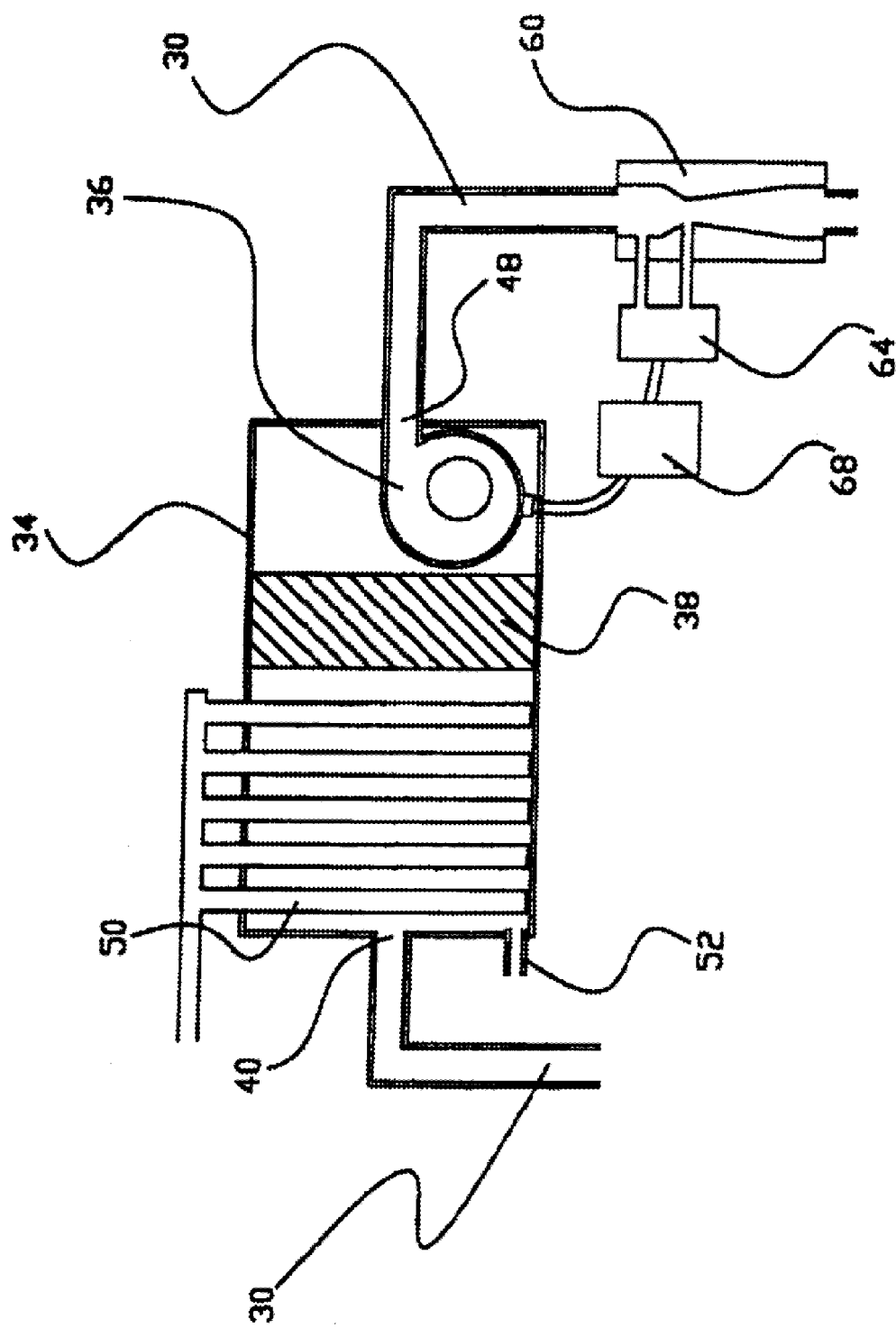
Figure 5A:
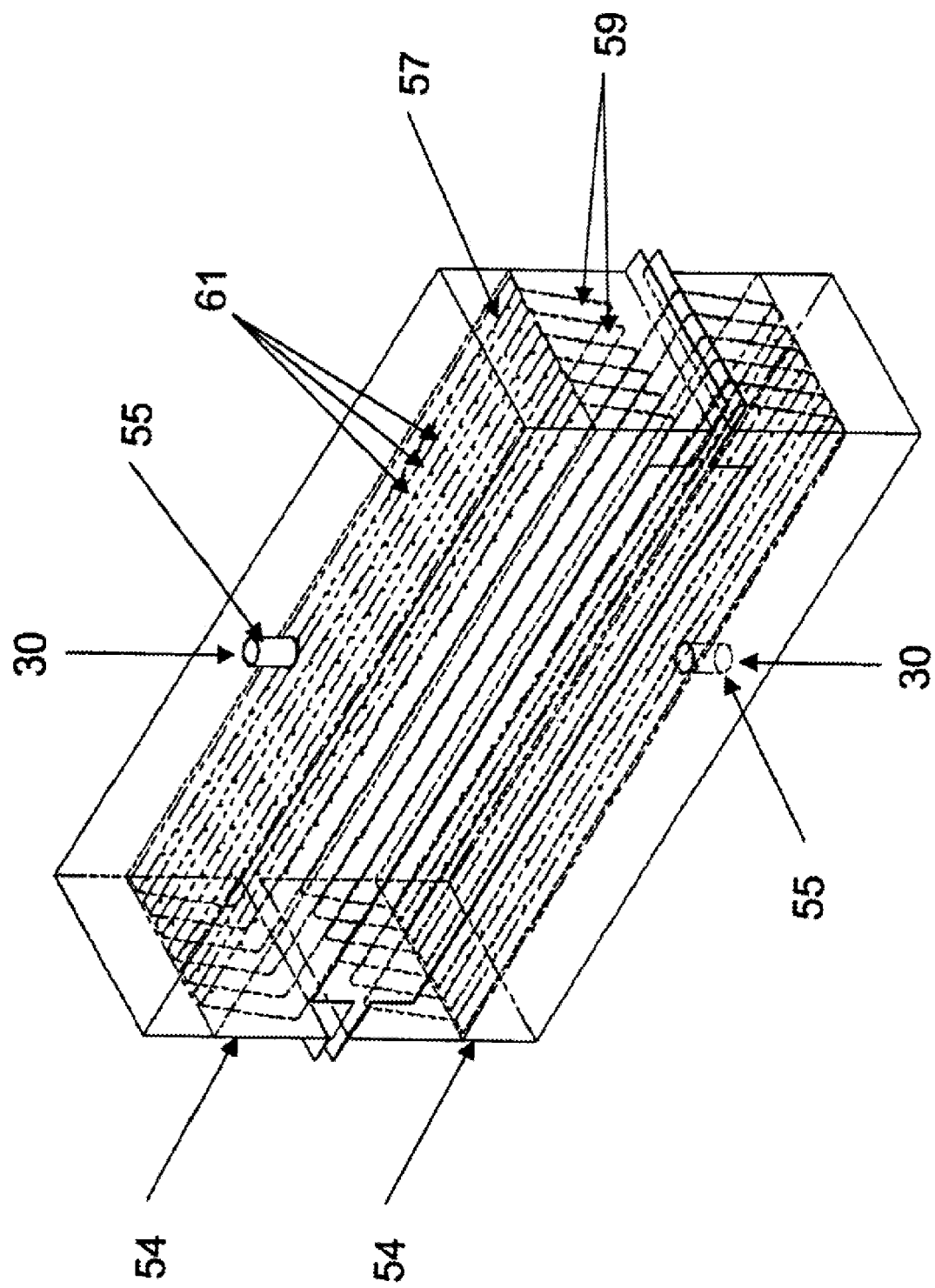
Figure 5B:
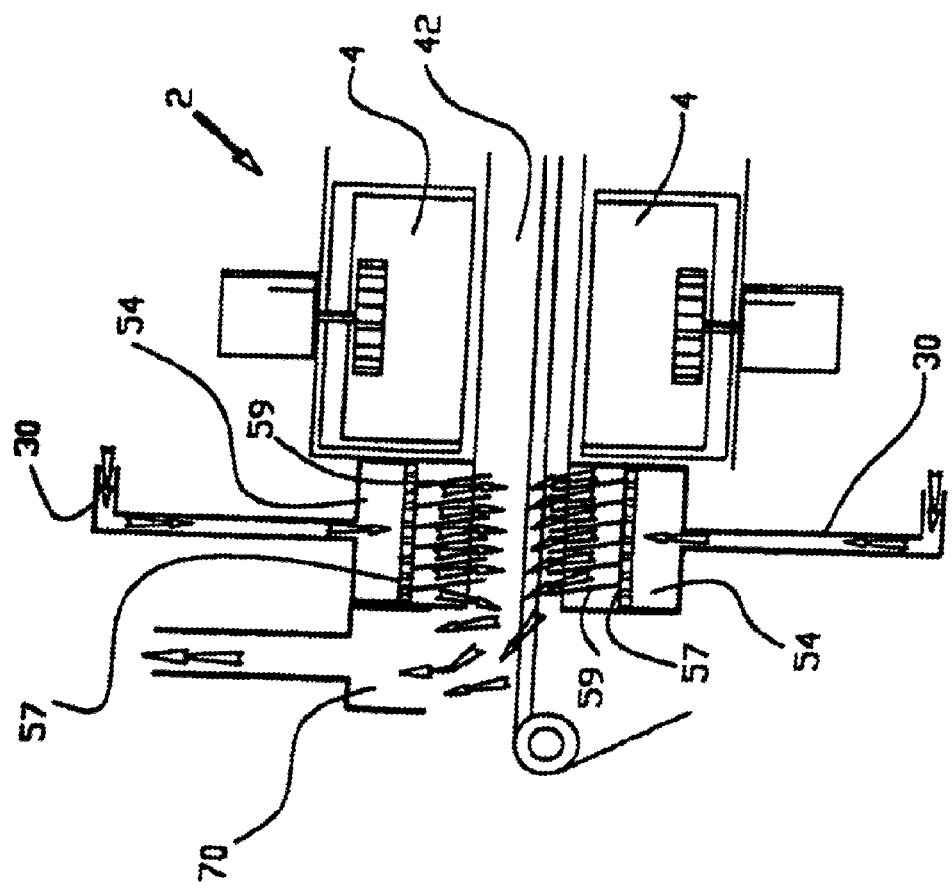
Figure 6:
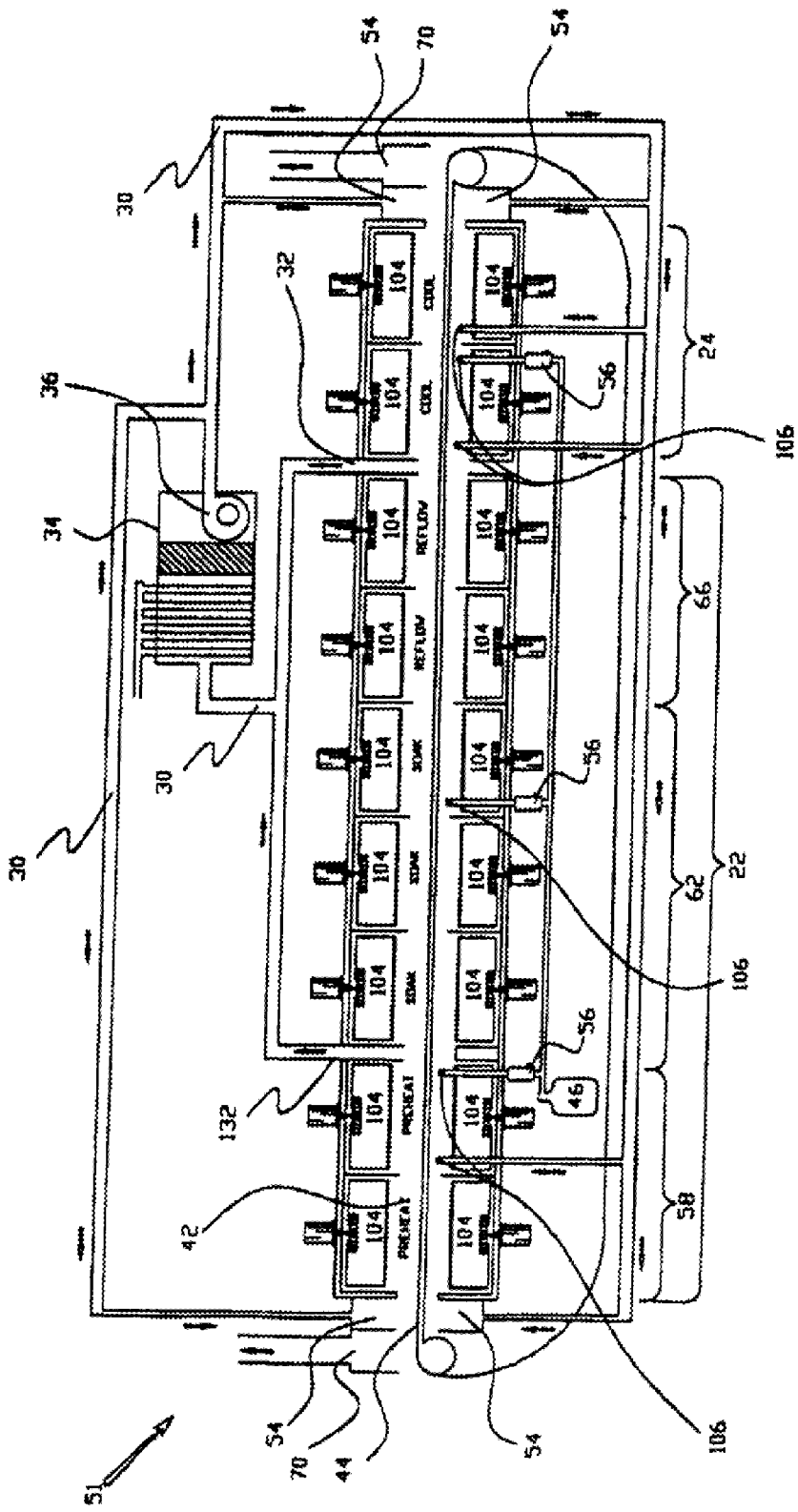
Figure 7:
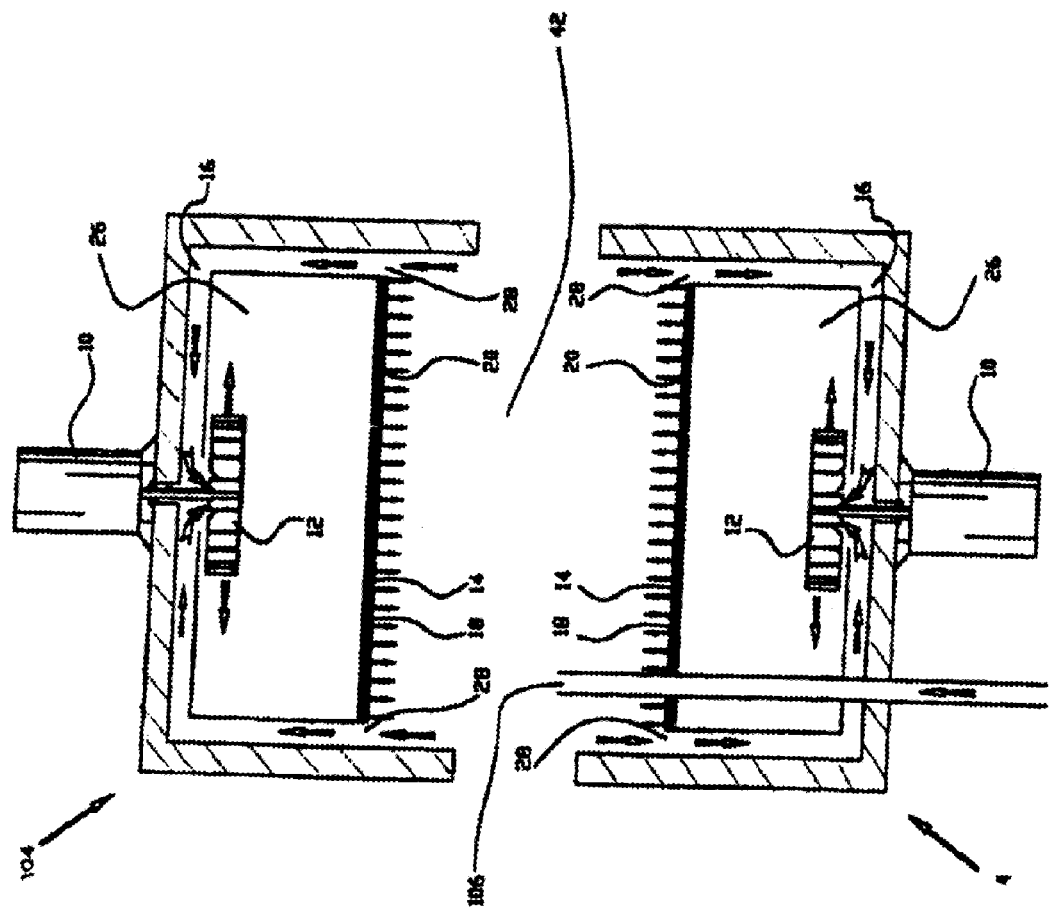
Figure 1:
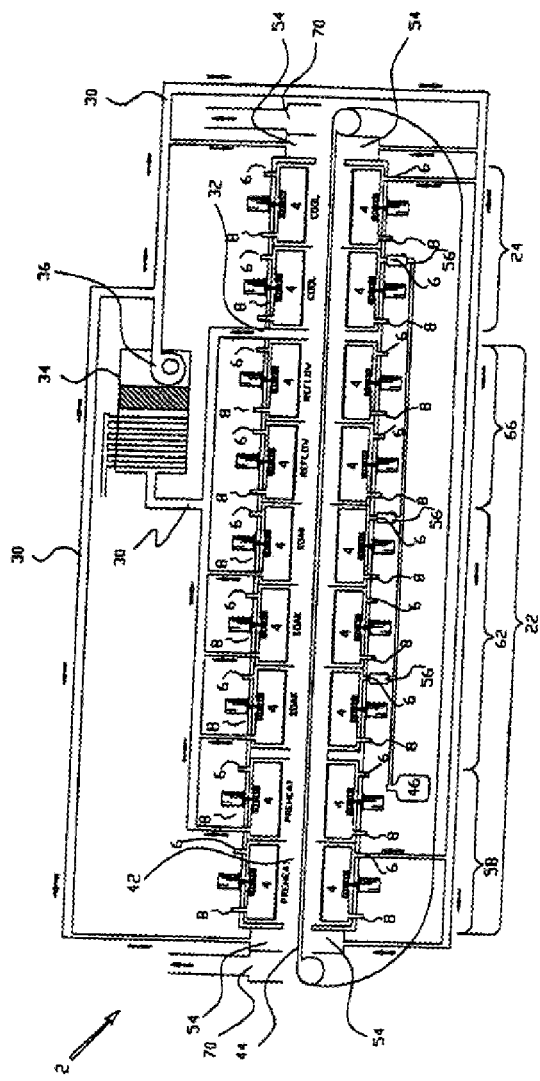
Figure 2:
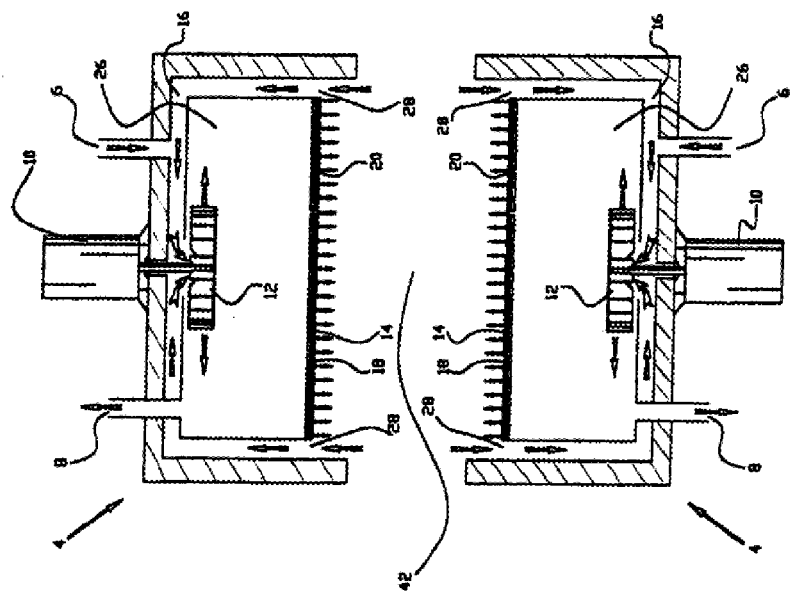
Figure 3:
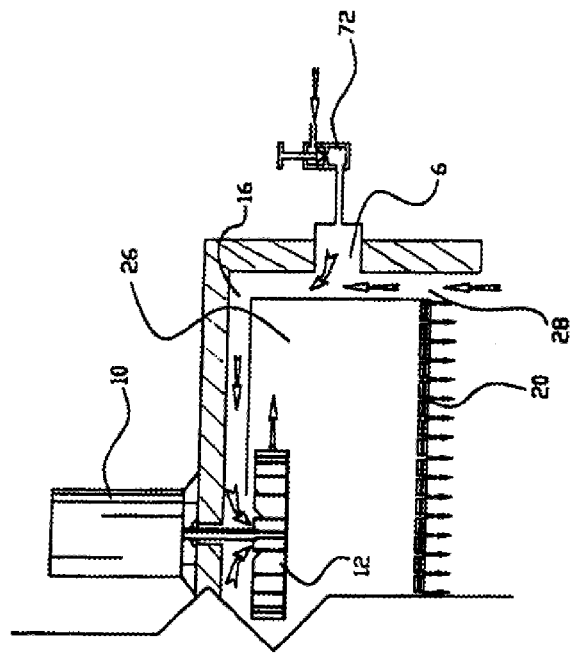
Figure 4:
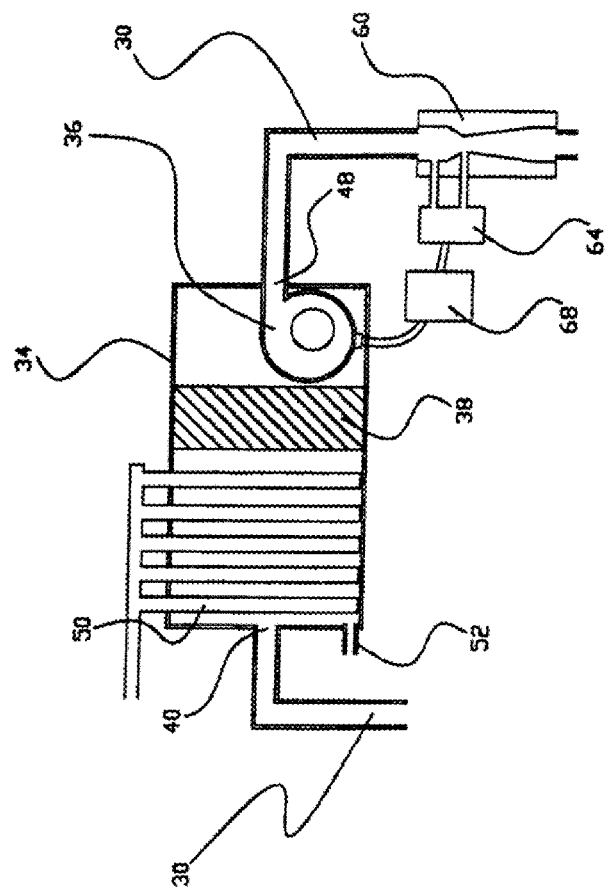
Figure 5A:
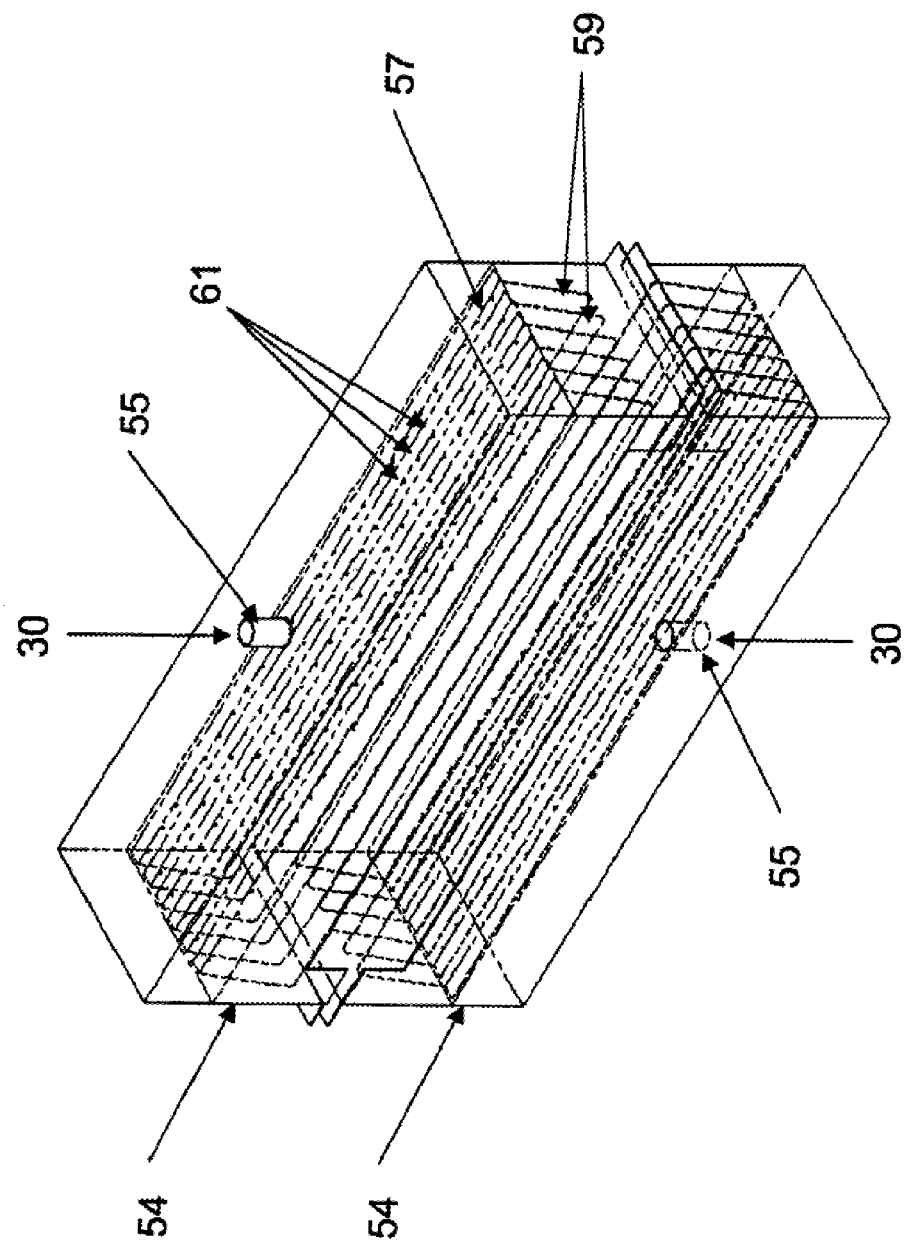
Figure 5B:
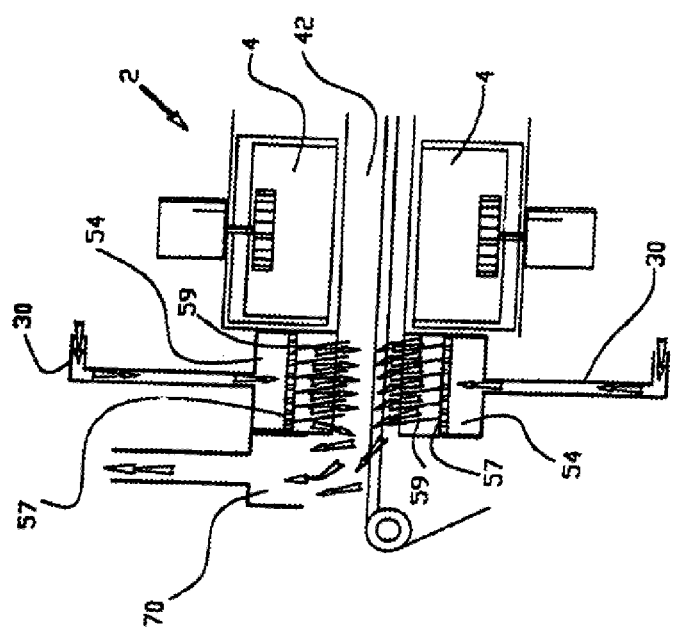
Figure 6:
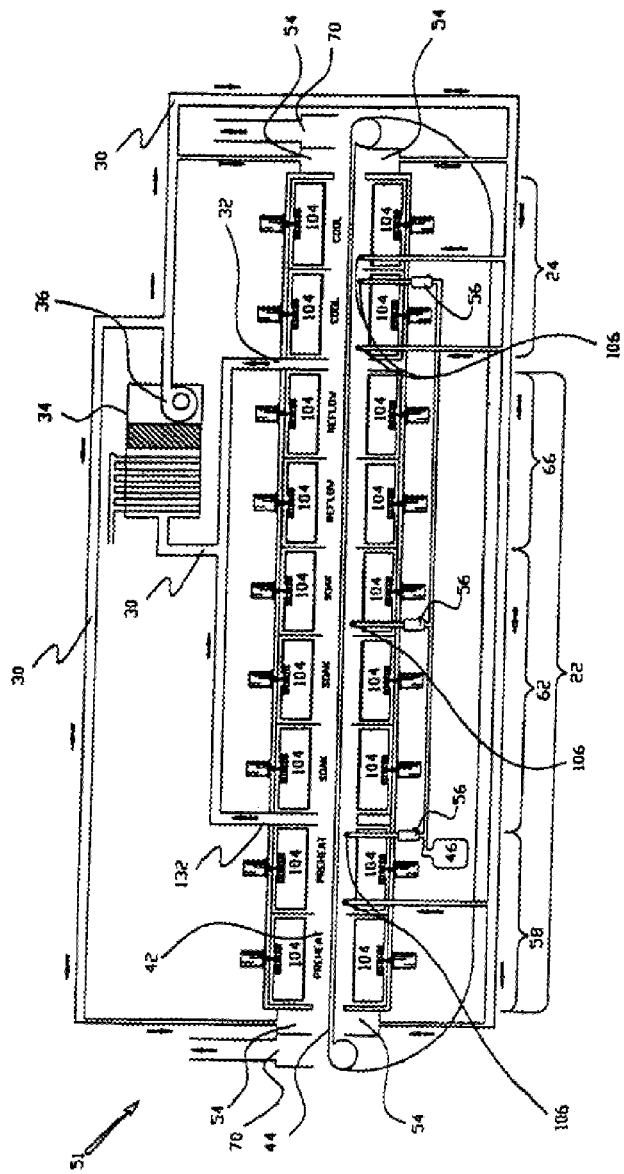
Figure 7:
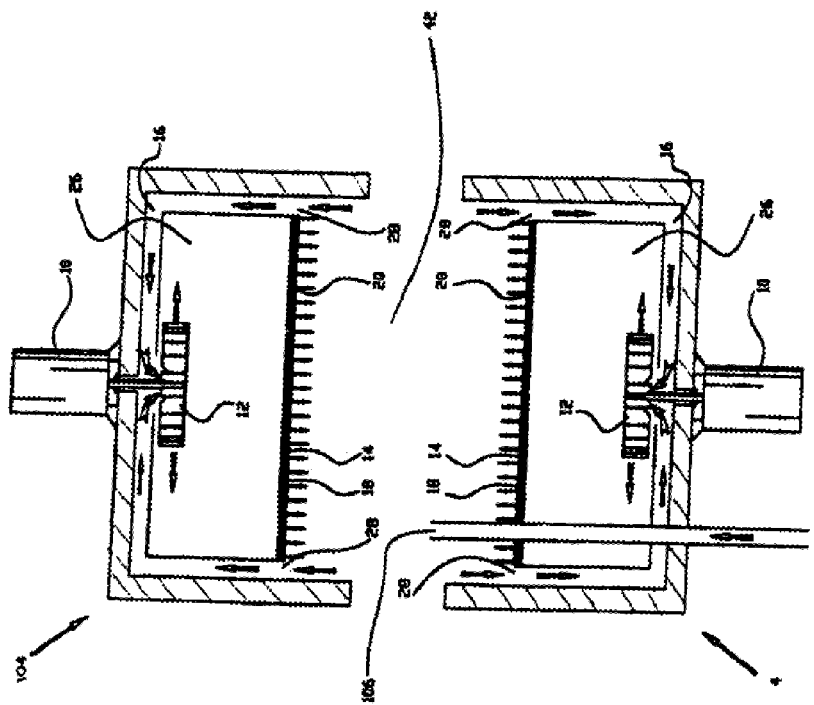

The temperature cell 104 of the second embodiment, illustrated in FIG. 7, shown as a top and bottom pair, is primarily the same temperature cell 4 of the first embodiment with the exception of an inlet 106. Inlet 106 may be provided near the return channel 16 such that gas introduced at the inlet 106 will enter the plenum 26 and be mixed with gas in the process tunnel 42.

In the oven 51, outlets 8, described in the preferred embodiment 2, are replaced with barrier vent 132, as shown in FIG. 6. Barrier vent 132 is located in the high temperature region 22 to control the flow direction of the expanding gas from the process gas reservoir 46 and is connected to the recirculation ducting 30 for cleaning by the condensation and filtration chamber 34. Gas is condensed, filtered, and reintroduced to the process tunnel 42 is the same manner as in the first embodiment 2. Similar to inlet 106, the method of using a main return duct like barrier vent 132 provides a flexibility to adapt existing reflow solder ovens with a gas management system as well as being the used in future reflow solder oven designs.

In a further alternative embodiment, low oxygen content in the tunnel gas is desired to improve the system performance, for example filtration of contaminants. A low flow valve, same as or similar to the low flow valve 72 of FIG. 3, is operably connected to an inlet port similar to inlet port 106 used for the delivery of primary inert gas. Low volumes of air bleed into the tunnel at one or more preselected locations, thereby controlling the parts per million of oxygen mixed with the tunnel gas. An alternative to the air bleed valves is a direct connection to an oxygen supply.

Although all of the detailed descriptions described above are directed toward an oven with temperature cells on the top and bottom of the process tunnel, it is understood that the present invention can also be implemented on an oven that either just top or just bottom temperature cells. It is further understood that the location, top or bottom of inlets and outlets is substantially unimportant to the function of the invention, as turbulence in the temperature cell and the process tunnel homogenize these flows instantly.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A solder reflow oven system comprising:

an oven having two ends, said oven capable of being sectioned into a plurality of zones, wherein each of said plurality of zones includes at least one heater, wherein said at least one heater includes a heater gas inlet port and a heater gas outlet port;

an oven vent being interposed between at least two zones of said plurality of zones;

a conveying mechanism for carrying objects to be heated through said oven from a first end of said ends to a second end of said ends;

a process gas reservoir capable of supplying substantially inert gas to said heater gas inlet port of preselected said at least one heater;

baffle means for forming a substantially impervious wall of gas at each of said ends substantially preventing air infiltration into said oven; and gas filtration means for substantially condensing and filtering contaminants from oven gas, said gas filtration means being in fluid communication with said heater gas outlet port of preselected said at least one heater and said oven vent to draw oven gas out of said oven, said gas filtration means being in fluid communication with said heater gas inlet port of preselected said at least one heater to reintroduce filtered gas back into said oven, wherein said gas filtration means being in fluid communication with said baffle means for supplying filtered gas to form the substantially impervious wall of gas.

2. The oven according to claim 1 further comprising exhaust means for venting gas from said oven to an external location, said exhaust means being in close proximity of said ends.

3. The oven according to claim 1 further comprising a flow meter disposed between said process gas reservoir and said gas inlet port, said flow meter being capable of controlling the volume of substantially inert gas into said oven to produce a desired pressure and flow direction in each of said plurality of zones.

4. The oven according to claim 1, further comprising a low flow valve being operably connected to said heater gas inlet port of preselected said at least one heater, said low flow valve being capable of bleeding external air into said oven at a rate sufficient to produce a predetermined oxygen content within said oven.

5. The oven according to claim 1, wherein said gas filtration means further comprises:
   a chamber having,
      a chamber inlet port being in fluid communication with said heater gas outlet port of preselected said at least one heater, and
      a chamber outlet port being in fluid communication with said heater gas inlet port of preselected said at least one heater and said baffle means;
   a recirculation blower being operably connected to said chamber inlet port and said chamber outlet port, said recirculation blower being capable of drawing oven gas out of said heater gas outlet port of preselected said at least one heater and into said chamber for filtration, said recirculation blower being further capable of blowing filtered gas to said heater gas inlet port of preselected said at least one heater and to said baffle means for supplying gas to form said substantially impervious wall of gas;
   a plurality of condensing plates contained within said chamber to condense into liquid volatiles contained in oven gas drawn from said oven;
   a drain being connected to said chamber forming a fluid passage to an exterior location to drain liquid out of said chamber that runs off said condensing plates; and
   a filter being disposed within said chamber and interposed between said condensing plates and said chamber outlet port to substantially filter impurities from oven gas drawn from said oven.

6. The oven according to claim 5, wherein said gas filtration means further comprises:
   a venturi flow meter being operably connected to said chamber outlet port to measure exit flow from said chamber;
   a pressure transmitter being operably connected to said venturi flow meter being capable of converting said measure of said exit flow into an electronic signal; and
   a computer being operably connected to said pressure transmitter and said recirculation blower, said computer being capable of calculating gas flow and controlling speed of said recirculation blower to maintain a substantially constant gas flow in said recirculation system, whereby reduced filtered gas flow due to saturation of said filter is compensated for with an increase blower speed.

7. The oven according to claim 6, wherein said computer is further capable of shutting off said recirculation blower when a predetermined blower speed is reached, thereby providing an indication to change said filter.

8. The oven according to claim 1, wherein said baffle means comprises:
   a chamber having a gas entry opening for receiving recirculated gas, a gas discharge opening, and side walls;
   a plurality of baffle plates, each said plurality of baffles plates arranged substantially parallel to another within said chamber, said plurality of baffle plates extending partially through said chamber, said plurality of baffle plates being angularly oriented with respect to said side walls to retard the motion of recirculated gas through said chamber;
   each of said plurality of baffle plates having an edge adjacent an orifice plate and an opposite edge arranged in close proximity of said gas discharge opening;
   said orifice plate having a plurality of holes to meter flow of recirculated gas past said plurality of baffle plates; and
   said gas discharge opening for discharging recirculated gas therefrom being positioned adjacent to said conveying mechanism;
   whereby said baffle means creates a series of low-level laminar flows off said opposite edge of said baffle plates into said ends of said oven to form a substantially impervious wall of recirculated gas.

9. A solder reflow oven system comprising:
   an oven having two ends, an entry end and an exit end;
   said oven capable of being sectioned into a plurality of zones, wherein each of said plurality of zones includes at least one heater;
   a conveying mechanism for carrying objects to be heated through said oven from said entry end to said exit end;
   at least one oven gas inlet port being interposed into said oven to introduce substantially inert or recirculated gas into said oven to influence gas flow direction within and out of said oven;
   at least one oven gas outlet port being interposed into said oven to remove oven gases from said oven for gas filtration and recirculation;
   a process gas reservoir capable of supplying substantially inert gas directly to said at least one oven gas inlet port;
   baffle means for forming a substantially impervious wall of gas at each of said ends of said oven substantially preventing air infiltration into said oven; and
   gas filtration means for condensing and filtering contaminants from said oven gases, said gas filtration means being in fluid communication with said at least one oven gas outlet to draw oven contaminated gas out of said oven, said gas filtration means being in fluid communication with select at least one oven gas inlet port to reintroduce filtered gas back into said oven, and said gas filtration means being in fluid communication with said baffle means for supplying filtered gas to form said substantially impervious wall of gas.

10. A system for removing contaminants from a solder reflow oven comprising:

at least one solder reflow oven exhaust being operably connected to the solder reflow oven;

baffle means for forming a substantially impervious wall of gas being operably connected to at least one end of the solder reflow oven;

at least one solder reflow oven inlet being operably connected to the solder reflow oven; and gas filtration means for condensing and filtering contaminants from solder reflow oven gases, said gas filtration means being operably connected to said at least one solder reflow oven exhaust, said baffle means, and said at least one solder reflow oven inlet, wherein said gas filtration means being capable of drawing solder reflow oven gases out of the solder reflow oven and substantially purifying the contaminated gas for reintroduction into the solder reflow oven to facilitate the control of gas flow within the solder reflow oven and for introduction into said baffle means to supply a pressurizing gas to form said substantially impervious wall of gas; and a process gas reservoir being operably connected directly to said at least one solder reflow oven inlet, wherein said process gas reservoir being capable of supplying substantially inert gas to facilitate the control of gas flow within the solder reflow oven.

11. A method for removing contaminates from a solder reflow oven sectioned into a plurality of temperature zones, said method comprising the steps of:

conveying objects to be heated through the solder reflow oven from an entry end to an exit end;

selectively introducing substantially inert gas from an external source to at least one of the plurality of temperature zones within the solder reflow oven;

selectively exhausting solder reflow oven gas from at least one of the plurality of temperature zones;

substantially removing contaminants from the solder reflow oven gas;

selectively diverting a portion of substantially decontaminated solder reflow oven gas to each end of the solder reflow oven forming a high pressure area and substantially preventing air infiltration into the solder reflow oven;

selectively reintroducing a remaining portion of the substantially decontaminated solder reflow oven gas into at least one of the plurality of temperature zones; and locating select substantially inert gas introduction points, solder reflow oven gas removal points, and substantially decontaminated solder reflow oven gas reintroduction points to influence gas flows within the solder reflow oven from a cool region to a higher temperature region than the cool region and from cooler to hotter areas within the higher temperature region to impede the flow of contaminated gas from migrating to the cooler regions where contaminated gas will condense.

12. The method according to claim 11 further comprising the step of adjusting the inert gas flow at each introduction point to compensate for the expansion rate of the solder reflow oven gas.

13. The method according to claim 11 further comprising the step of exhausting excess substantially decontaminated solder reflow oven gas at each end of the solder reflow oven.

14. A solder reflow oven system used in conjunction with a solder reflow oven, said solder reflow oven system comprising:

at least one external source of substantially inert gas directly being operably connected to at least one of a plurality of temperature zones of the solder reflow oven for selective introduction of substantially inert gas into the solder reflow oven;

at least one vent to selectively vent solder reflow oven gas from a preselected at least one of a plurality of temperature zones;

at least one baffle device adjacent to at least one end of the solder reflow oven forming a substantially impervious wall of gas and substantially preventing air infiltration into the solder reflow oven at the at least one end of the solder reflow oven;

a solder reflow oven decontamination device for substantially removing contaminants from the solder reflow oven gas, said solder reflow oven decontamination device being operably connected to said at least one vent to said at least one baffle device and to a predetermined at least one of a plurality of temperature zones;

said solder reflow oven decontamination device further comprising means for creating a vacuum to draw the solder reflow oven gas from the solder reflow oven through said at least one vent; and said solder reflow oven decontamination device further comprising means for creating a positive pressure to recirculate substantially decontaminated solder reflow oven gas to said at least one baffle device and to said predetermined at least one of said plurality of temperature zones.

15. The system according to claim 14 further comprising at least one inert gas adjustment mechanism connected to the at least one of the plurality of temperature zones, said at least one inert gas adjustment mechanism being capable of controlling the flow of the solder reflow oven gas.

16. The system according to claim 14 wherein said at least one vent is disposed between at least one cool region and at least one higher temperature region of the solder reflow oven.

17. The system according to claim 14 wherein said at least one vent is disposed in at least one of the plurality of temperature zones.

18. The system according to claim 14 wherein the plurality of temperature zones comprises at least one preheat zone and said at least one vent is disposed in a preselected region of said at least one preheat zone.

19. The system according to claim 14 wherein the plurality of temperature zones comprises at least one soak zone and said at least one vent is disposed in a preselected region of said at least one soak zone.

20. The system according to claim 14 wherein the plurality of temperature zones comprises at least one reflow zone and said at least one vent is disposed in a preselected region of at least one reflow zone.

21. The system according to claim 14 wherein the plurality of temperature zones comprises at least one cool zone and said at least one vent is disposed in a preselected region of said at least one cool zone.

22. The system according to claim 14 further comprising an exhaust disposed at said at least one end of said solder reflow oven, said exhaust being capable of exhausting excess substantially decontaminated solder reflow oven gas.

* * * * *

UNITED STATES PATENT AND TRADEMARK OFFICE
CERTIFICATE OF CORRECTION

PATENT NO. : 6,780,225 B2  Page 1 of 10
APPLICATION NO. :10/185377
DATED : August 24, 2004
INVENTOR(S) : Shaw et al.

It is certified that error appears in the above-identified patent and that said Letters Patent is hereby corrected as shown below:

Title page:

The illustrative figure should be deleted and substitute therefore the attached title page.

Drawings:

Delete Figures 1, 2, 3, 4, 4A, 4B, 5, 5A, 5B, 6 and 7, and substitute therefore Figures 1, 2, 3, 4, 5A, 5B, 6 and 7, shown on the attached 8 pages.

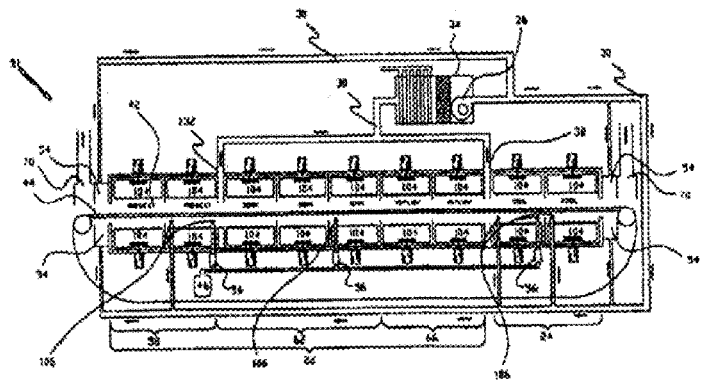

Claims:

Claim 14, line 5 (column 12, line 2), "directly being operably connected" should read --being directly operably connected--; and Claim 14, line 21 (column 12, line 18), "vent to" should read --vent, to--.

Signed and Sealed this

First Day of January, 2008

JON W. DUDAS
*Director of the United States Patent and Trademark Office*

(12) United States Patent
Shaw et al.

(10) Patent No.: US 6,780,225 B2
(45) Date of Patent: Aug. 24, 2004

(54) REFLOW OVEN GAS MANAGEMENT SYSTEM AND METHOD

(75) Inventors: Russell G. Shaw, Hopkinton, NH (US); Roy J. Palhof, York, ME (US)

(73) Assignee: Vitronics Soltec, Inc., Stratham, NH (US)

(*) Notice: Subject to any disclaimer, the term of this patent is extended or adjusted under 35 U.S.C. 154(b) by 22 days.

(21) Appl. No.: 10/185,377

(22) Filed: Jun. 27, 2002

(65) Prior Publication Data
US 2003/0218058 A1 Nov. 27, 2003

Related U.S. Application Data
(60) Provisional application No. 60/383,165, filed on May 24, 2002.

(51) Int. Cl.$^7$ .............. B23K 1/008; B01D 53/26
(52) U.S. Cl. .............. 95/273; 95/288; 55/385.6; 55/DIG. 29; 34/77; 34/79; 34/468; 228/43; 228/219; 432/176; 219/388
(58) Field of Search ............... 34/76, 77, 79, 34/468, 469; 95/273, 288; 55/385.1, 385.6, 392, 467.1, 338.1, DIG. 29; 228/42, 43, 219, 220; 432/176; 219/388

(56) References Cited
U.S. PATENT DOCUMENTS

| | | | |
|---|---|---|---|
| 3,543,532 A | 12/1970 | Galton et al. | 62/256 |
| 3,625,133 A | 12/1971 | Hayashi | 98/36 |
| 4,321,031 A | * 3/1982 | Woodgate | 432/11 |
| 4,696,226 A | 9/1987 | Witmer | 98/36 |
| 4,726,506 A | * 2/1988 | Kondo | 228/37 |
| 4,823,680 A | 4/1989 | Nowotarski | 98/36 |
| 4,951,401 A | 8/1990 | Suzuki et al. | 34/77 |
| 5,031,818 A | 7/1991 | Gieskes | 228/42 |
| 5,069,380 A | 12/1991 | Deambrosio | 228/42 |
| 5,090,651 A | 2/1992 | Mittag | 228/219 |

(List continued on next page.)

FOREIGN PATENT DOCUMENTS

| | | |
|---|---|---|
| EP | 0 307 319 A | 3/1989 |
| EP | 0631530 B1 | 7/1996 |
| EP | 0 999 007 A | 5/2000 |
| JP | 2002-246738 A | * 6/2003 |

OTHER PUBLICATIONS

*US Patent Application Publication, Publication No. US2002/0018977A1, Publication date Feb. 14, 2002, "Continuous Furnace Having Traveling Gas Barrier," Gary Orbeck, filing date Aug. 30, 2001, Cl. 432/121.

"Flux Flow Control™ Prevents Process Contaminants Getting Into the Cooling Zone No Process Filters or Condensers", News Bulletin Nr. 4, Jan. 1999.

International Search Report, Sep. 15, 2003, PCT/US03/16528 (29582-101PCT).

International Application No. PCT/US03/16528 (29582-101PCT), International Filing Date May 23, 2003.

Primary Examiner—Frank M. Lawrence
(74) Attorney, Agent, or Firm—Perkins Smith & Cohen, LLP; Jacob N. Erlich; Peter J. Borghetti

(57) ABSTRACT

Reflow solder oven gas management system introduces an inert gas into and removes contaminated gas from a reflow oven tunnel (42) at predetermined points (6, 8) to influence the oven tunnel gas flow and to dilute and expel excess oxygen. The contaminated gas is ducted to a flux separation system (34) to be cleaned, for example remove flux vapors, and returned in part to the tunnel (42) for recirculation and with the remainder routed to end baffle boxes (54) for tunnel end pressurization and exhaust. The system has sufficient pressure to supply end baffle boxes (54) with clean gas to create a gas barrier to effectively seal off the tunnel ends from air infiltration or migration into the tunnel making the system insensitive to external pressure and/or temperature variations. The invention also includes alternative embodiments, low flow oxygen bleed valves (72) to maintain low oxygen content in the oven process tunnel.

22 Claims, 11 Drawing Sheets

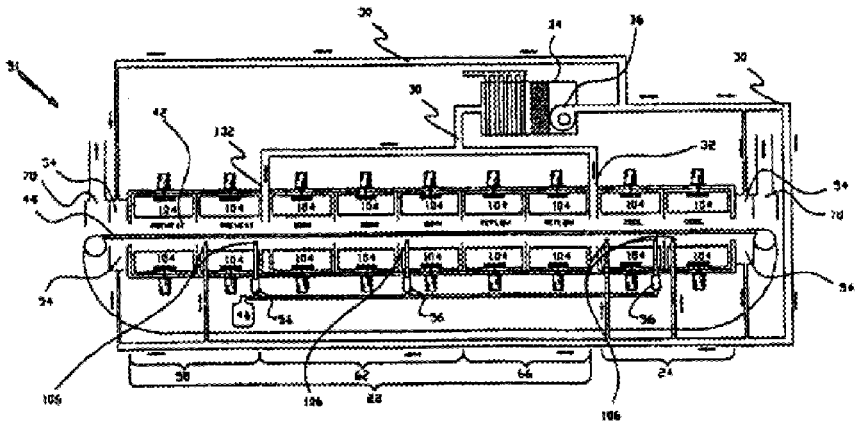

UNITED STATES PATENT AND TRADEMARK OFFICE
CERTIFICATE OF CORRECTION

| | |
|---|---|
| PATENT NO. | : 6,780,225 B2 |
| APPLICATION NO. | :10/185377 |
| DATED | : August 24, 2004 |
| INVENTOR(S) | : Shaw et al. |

It is certified that error appears in the above-identified patent and that said Letters Patent is hereby corrected as shown below:

Title page:

The illustrative figure should be deleted and substitute therefore the attached title page.

Drawings:

Delete Figures 1, 2, 3, 4, 4A, 4B, 5, 5A, 5B, 6 and 7, and substitute therefore Figures 1, 2, 3, 4, 5A, 5B, 6 and 7, shown on the attached 8 pages.

Claim 14, line 5 (column 12, line 2), "directly being operably connected" should read --being directly operably connected--; and Claim 14, line 21 (column 12, line 18), "vent to" should read --vent, to--.

Signed and Sealed this

Twenty-second Day of January, 2008

JON W. DUDAS
*Director of the United States Patent and Trademark Office*

(12) United States Patent
Shaw et al.

(10) Patent No.: US 6,780,225 B2
(45) Date of Patent: Aug. 24, 2004

(54) REFLOW OVEN GAS MANAGEMENT SYSTEM AND METHOD

(75) Inventors: Russell G. Shaw, Hopkinton, NH (US); Roy J. Pathof, York, ME (US)

(73) Assignee: Vitronics Soltec, Inc., Stratham, NH (US)

(*) Notice: Subject to any disclaimer, the term of this patent is extended or adjusted under 35 U.S.C. 154(b) by 22 days.

(21) Appl. No.: 10/185,377

(22) Filed: Jun. 27, 2002

(65) Prior Publication Data
US 2003/0218058 A1 Nov. 27, 2003

Related U.S. Application Data
(60) Provisional application No. 60/383,165, filed on May 24, 2002.

(51) Int. Cl.$^7$ .................. B23K 1/008; B01D 53/26
(52) U.S. Cl. .................. 95/273; 95/288; 55/385.6; 55/DIG. 29; 34/77; 34/79; 34/468; 228/43; 228/219; 432/176; 219/388
(58) Field of Search .................. 34/76, 77, 79, 34/468, 469; 95/273, 288; 55/385.1, 385.6, 392, 467.1, 338.1, DIG. 29; 228/43, 43, 219, 220; 432/176; 219/388

(56) References Cited
U.S. PATENT DOCUMENTS

| 3,543,532 A | 12/1970 | Catton et al. | 62/256 |
| 3,625,133 A | 12/1971 | Hayashi | 98/36 |
| 4,321,031 A | * 3/1982 | Woodgate | 432/11 |
| 4,696,226 A | 9/1987 | Witmer | 98/36 |
| 4,726,506 A | * 2/1988 | Kondo | 228/37 |
| 4,823,680 A | 4/1989 | Nowotarski | 98/36 |
| 4,951,401 A | 8/1990 | Suzuki et al. | 34/77 |
| 5,031,818 A | 7/1991 | Gieskes | 228/42 |
| 5,069,380 A | 12/1991 | Deambrosio | 228/42 |
| 5,090,651 A | 2/1992 | Mittag | 228/219 |

(List continued on next page.)

FOREIGN PATENT DOCUMENTS

| EP | 0 307 319 A | 3/1989 |
| EP | 0631530 B1 | 7/1998 |
| EP | 0 999 007 A | 5/2000 |
| JP | 2002-246738 A | * 6/2003 |

OTHER PUBLICATIONS

*US Patent Application Publication, Publication No. US2002/0018977A1, Publication date Feb. 14, 2002, "Continuous Furnace Having Traveling Gas Barrier," Gary Orbeck, filing date Aug. 30, 2001, CL 432/121.
"Flux Flow Control™ Prevents Process Contaminants Getting Into the Cooling Zone No Process Filters or Condensers", News Bulletin Nr. 4, Jan. 1999.
International Search Report, Sep. 15, 2003, PCT/US03/16528 (29582–101PCT).
International Application No. PCT/US03/16528 (29582–101PCT), International Filing Date May 23, 2003.

*Primary Examiner*—Frank M. Lawrence
(74) *Attorney, Agent, or Firm*—Perkins Smith & Cohen, LLP; Jacob N. Erlich; Peter J. Borghetti

(57) ABSTRACT

Reflow solder oven gas management system introduces an inert gas into and removes contaminated gas from a reflow oven tunnel (42) at predetermined points (6, 8) to influence the oven tunnel gas flow and to dilute and expel excess oxygen. The contaminated gas is ducted to a flux separation system (34) to be cleaned, for example remove flux vapors, and returned in part to the tunnel (42) for recirculation and with the remainder routed to end baffle boxes (54) for tunnel end pressurization and exhaust. The system has sufficient pressure to supply end baffle boxes (54) with clean gas to create a gas barrier to effectively seal off the tunnel ends from air infiltration or migration into the tunnel making the system insensitive to external pressure and/or temperature variations. The invention also includes alternative embodiments, low flow oxygen bleed valves (72) to maintain low oxygen content in the oven process tunnel.

22 Claims, 11 Drawing Sheets